United States Patent
Furey

(10) Patent No.: US 11,315,176 B2
(45) Date of Patent: *Apr. 26, 2022

(54) SYSTEMS AND METHODS FOR IMPLEMENTING AUCTIONS ASSOCIATED WITH LIVE EVENTS

(71) Applicant: SCOREMORE LLC, Barrington, IL (US)

(72) Inventor: Pamela J. Furey, Barrington, IL (US)

(73) Assignee: SCOREMORE LLC, Barrington, IL (US)

( * ) Notice: Subject to any disclaimer, the term of this patent is extended or adjusted under 35 U.S.C. 154(b) by 19 days.

This patent is subject to a terminal disclaimer.

(21) Appl. No.: 16/752,334

(22) Filed: Jan. 24, 2020

(65) Prior Publication Data

US 2020/0160436 A1     May 21, 2020

Related U.S. Application Data

(63) Continuation of application No. 14/928,642, filed on Oct. 30, 2015, now Pat. No. 10,546,345.

(60) Provisional application No. 62/073,673, filed on Oct. 31, 2014.

(51) Int. Cl.
| | |
|---|---|
| *G06Q 30/00* | (2012.01) |
| *G06Q 30/08* | (2012.01) |
| *G06Q 20/10* | (2012.01) |
| *H04W 4/021* | (2018.01) |
| *G06Q 20/32* | (2012.01) |

(52) U.S. Cl.
CPC .............. *G06Q 30/08* (2013.01); *G06Q 20/10* (2013.01); *G06Q 20/3223* (2013.01); *G06Q 20/3224* (2013.01); *H04W 4/021* (2013.01)

(58) Field of Classification Search
None
See application file for complete search history.

(56) References Cited

U.S. PATENT DOCUMENTS

| | | |
|---|---|---|
| 5,835,896 A | 11/1998 | Fisher et al. |
| 7,200,570 B1 | 4/2007 | Wu |
| 8,391,773 B2 | 3/2013 | Arseneau et al. |
| 8,645,992 B2 | 2/2014 | Russell et al. |

(Continued)

OTHER PUBLICATIONS

Abhaya Asthana et al. "An Indoor Wireless System for Personalized Shopping Assistance", Mobile Computing System and Applications, 1994, pp. 69-74. (Year: 1994).

(Continued)

*Primary Examiner* — Naeem U Haq
(74) *Attorney, Agent, or Firm* — Marshall, Gerstein & Borun LLP

(57) ABSTRACT

A mobile auction and engagement system, and method of use, for conducting auctions, advertising activities, promotions, and other engagement activities during various live events. Access to the mobile auction and engagement system can be limited to users within a geographic region, such as a sport stadium. The system includes a user tool that enables a user within the permissible geographic area to bid on auction items and participate in engagement activities, such as trivia contests. The system further includes an administrative tool that allows the system to be customized for various customers, allows input about auction items and rules, and determines how advertisements are presented.

20 Claims, 23 Drawing Sheets

(56) References Cited

U.S. PATENT DOCUMENTS

| | | | |
|---|---|---|---|
| 8,661,121 B1 | 2/2014 | Mendis | |
| 8,849,310 B2 | 9/2014 | Fan et al. | |
| 8,858,313 B1 | 10/2014 | Selfors | |
| 9,316,740 B2 | 4/2016 | Ghinamo | |
| 9,398,405 B2 | 7/2016 | Fan et al. | |
| 2002/0016743 A1 | 2/2002 | Dorr | |
| 2002/0116215 A1 | 8/2002 | Lawrence et al. | |
| 2003/0062907 A1 | 4/2003 | Nevermann | |
| 2006/0179056 A1 | 8/2006 | Rosenberg | |
| 2008/0004038 A1 | 1/2008 | Dunko | |
| 2008/0102947 A1 | 5/2008 | Hays et al. | |
| 2011/0165924 A1* | 7/2011 | Gorder .................... | A63F 13/46 463/9 |
| 2012/0238257 A1 | 9/2012 | Anson | |
| 2013/0116044 A1 | 5/2013 | Schwartz | |
| 2013/0191215 A1 | 7/2013 | Metcalf | |
| 2013/0260790 A1 | 10/2013 | Itzhaki et al. | |
| 2014/0340021 A1 | 11/2014 | Lai | |
| 2016/0012520 A1 | 1/2016 | Aquino | |
| 2016/0098787 A1 | 4/2016 | Caldwell | |
| 2017/0316494 A1 | 11/2017 | Brenhouse et al. | |

OTHER PUBLICATIONS

Edieal J. Pinker et al. "Managing Online Auctions: Current Business and Research Issues", Management Science © 2003 INFORMS vol. 49, No. 11, Nov. 2003, pp. 1457-1484. (Year: 2003).

Paul Klemperer, "Auctions: Theory and Practice" ©2004 Princeton University Press, pp. 1-5. (Year: 2004).

\* cited by examiner

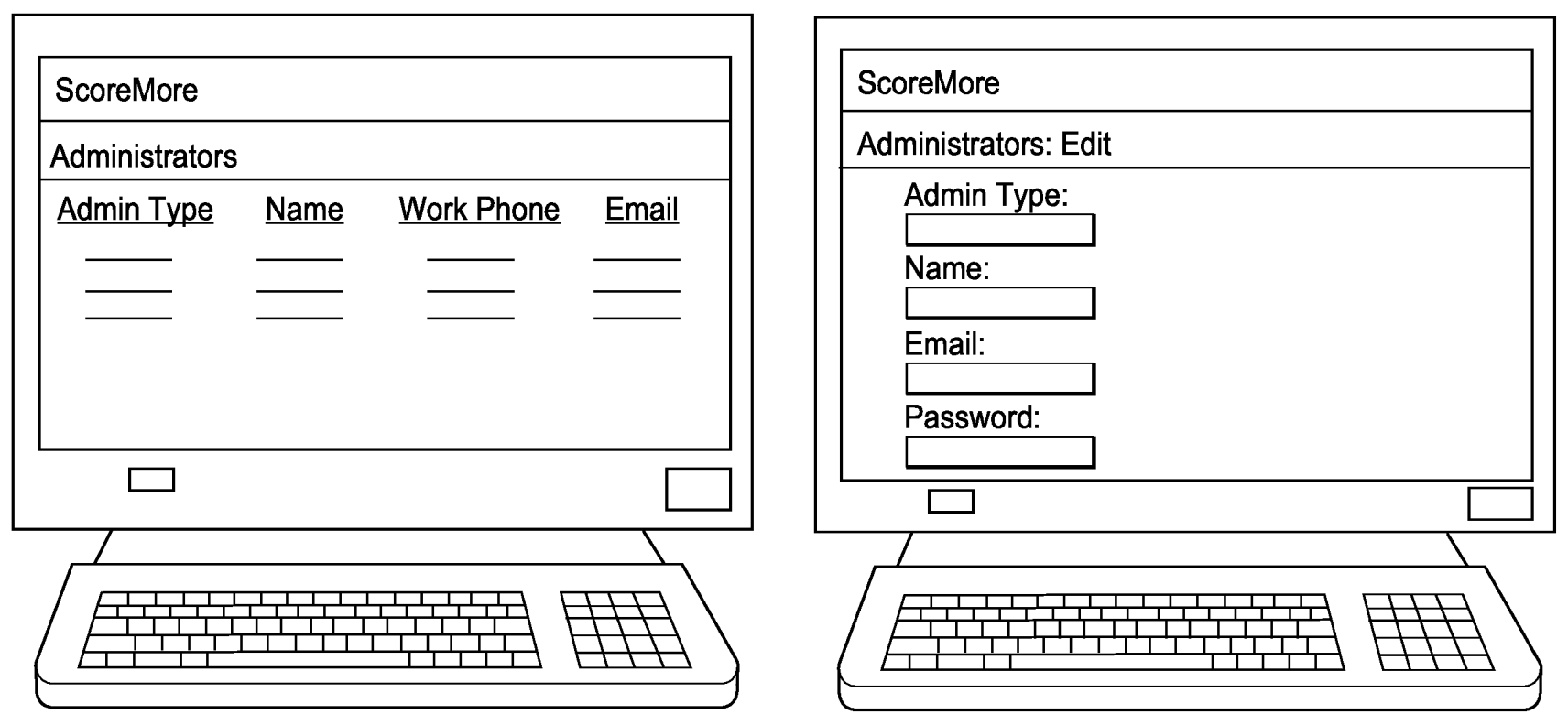

ScoreMore

Administrators: Edit

Admin Type:
Name:
Email:
Password:

FIG. 14B

ScoreMore

Administrators

Admin Type    Name    Work Phone    Email

FIG. 14A

SYSTEMS AND METHODS FOR IMPLEMENTING AUCTIONS ASSOCIATED WITH LIVE EVENTS

CROSS-REFERENCE TO RELATED APPLICATION

The present application is a continuation of U.S. patent application Ser. No. 14/928,642, filed on Oct. 30, 2015, which claims the benefit of the filing date of U.S. Provisional Application No. 62/073,673 filed Oct. 31, 2014. The entire text of these applications are hereby incorporated by reference in their entireties.

FIELD OF THE DISCLOSURE

The present disclosure generally relates to entertainment solutions enabled by mobile cloud technology, and, more particularly, to a method and apparatus for conducting auctions, advertising activities, promotions, and other engagement activities during entertainment events, such as sporting events or other types of live events.

BACKGROUND

Professional sports leagues and teams are actively investing millions to enhance the wireless and broadband capabilities of their stadiums to support their fans' increased use of mobile devices. The leagues and teams are seeking innovative mobile software solutions to transform their relationship with their fans and partners. The leagues and teams therefore recognize the importance of the fan experience and its impact on revenue generation. The need for fan engagement solutions is so acute that leading media and technology companies serving the sports and entertainment industry have created business units to focus on enhancing the fan experience.

Certain solutions exist in the charity auction context, such as those that enable charity auction attendees to bid via their mobile devices on items up for auction. However, the mobile software solutions employed in the charity auction context are limited in that they do not allow users to self-register, instead requiring users to be manually registered by auction administrative personnel. Although registration by auction administrative personnel is feasible for the number of attendees typically attending a charity auction, it would not be possible in the entertainment events context, as thousands of spectators often attend at these events. Likewise, mobile software solutions employed in the charity auction context do not allow self-checkout on a mobile device.

These existing solutions are further limited in that they do not restrict auction participants to those who actually attend the auction. Indeed, charity auctions benefit from having bidders who are not present participate in the auction. This is also true for general online auction systems such as eBay®. In contrast, sporting and event venues may want to restrict participation in a mobile program to attendees at the stadium in order to provide an incentive to attend the game in person rather than watch it on television.

Further, the existing solutions allow only for customer-to-business payments. For example, an eBay customer pays directly to the eBay business from which it is purchasing a product. In a professional sports setting, a sport team may wish to outsource management of payments to another company, thus requiring a more complicated payment process that allows for business-to-business payments.

SUMMARY

The techniques of the present disclosure generally relate to the sizable and emerging space of professional sports and entertainment solutions enabled by mobile cloud technology. In particular, the techniques of the present disclosure facilitate interactive mobile auctions with additional engagement activities to increase fan engagement, improve fan experience, and enhance team sponsorship revenues.

The systems and methods may be implemented as part of an auction platform, which may include a set of applications, modules, or engines capable of implementing the various functionalities described herein. The auction platform may provide a 'during the event' auction that authentically engages attendees via a smartphone, tablet computer, or another mobile device. For example, attendees can bid on once-in-a-lifetime auction items such as a coin toss, a jet ride with the team, or participating role in some aspect of the event. Further, the auction platform may facilitate other mobile device engagement activities, such as trivia challenges, promotions, and advertising. For example, users of mobile devices interacting with the auction platform may be prompted to answer trivia questions during a sporting event that are directly related to the sporting event (e.g., related to a team playing at the sporting event), and prizes such as refreshments or stadium store gift certificates may be distributed to winning users who, for example, are the first to correctly answer a number of questions or are randomly drawn from a pool of users who have correctly answered trivia questions.

Users interacting with the auction platform may be presented with advertisements during the auction, a trivia challenge, or another engagement activity. In some cases, these advertisements may be configured to rotate, or otherwise interchange, such that many sponsors may gain exposure during events. In particular, a rotating advertisement screen saver may provide advertisers with a larger sized advertisement that may be displayed throughout the entire event, an advantage over traditional small banner advertisements displayed only during active user interaction with the device.

In some implementations, auctions or other engagement activities may be limited to users of mobile devices at a particular event (e.g., constrained by geolocation). In other implementations, auctions or other engagement activities may be visible from anywhere in the world. If limited to users of mobile devices at a particular event taking place at a venue, the auction may lure attendees into the venue, as the thrill of the live event may strengthen the host's relationship with the attendee. Limiting the ability to participate in the mobile auction or other engagement activities to attendees of a particular event may help to justify the ticket price for attending the event.

To ensure that payments for auctions and other engagement activities are received from users of the auction platform, the auction platform may utilize payment and/or registration techniques that prevent a loss or inability for attendees to pay for prizes, auction items, etc. In particular, the auction platform may allow users to register, via contact information, payment details, email, etc., prior to participating in auctions. In this manner, users may authorize the auction platform to seamlessly and automatically complete transactions upon the close of an auction, or at any other pre-determined or dynamically determined times.

The auction platform may enable both users (e.g., attendees of live events) and administrators to connect thereto. In particular, administrators may interface with the auction platform to configure and initiate a set of auctions corresponding to a set of events. Further, users may connect to the auction platform to access, view, and participate in the set of auctions. The auction platform enables users to self-register with the auction platform, such as by creating an account, thereby enabling the users to access the set of auctions. According to embodiments, various of the set of auctions may have a geographic restriction, whereby auction participants may be limited to users located within a set boundary.

The user may access many current items or experiences up for auction at a particular auction, whereby certain items or experiences may be classified as "hot" based on the number of recent bids, the number of views, or based on some other metric. The items up for auction may, in particular, be "once-in-a-lifetime" experiences or opportunities. For example, a once-in-a-lifetime experience may be to flip the coin prior to kickoff of a football game. The auction platform may enable a user to place a bid, place a maximum auto bid, or pay a set price that automatically wins the item or experience. The auction platform may also alert a user know when the user has been outbid and enable the user to bid again. The auction platform may inform a user when the user has won an item or experience from the auction or when the user has not won. The auction platform enables a user to provide payment information, indicates when a payment has been approved or declined, and presents the user with a receipt. The auction platform may automatically facilitate redemption of the item or experience won upon the auction ending. In addition, the auction platform may enable a user to participate in a trivia engagement activity by answering trivia questions, being informed whether the answer was correct or incorrect, keeping track of trivia points scored, and enabling a user to redeem the trivia points for prizes.

The auction platform may also support various functionalities for administrators or otherwise users who are authorized to configure and initiate auctions. In particular, the auction platform may enable administrators to customize and monitor the auction platform for customers, such as sports teams or entertainment venues, and to set the activities and information that will be viewable by users of the auction platform, such as attendees at a sporting event. The auction platform may automatically monitor the number of registered users, details about the users, the number of auctions, details about current and upcoming auctions such as start and end times and bid history, and the number of total sold items. The auction platform enables administrators to configure a new auction, specify whether an auction is locked to a specific geographic area or not, input the start and end time of the auction and the time zone for which those start and end times are applicable, identify the currency used for the auction, select a default refund policy for the auction items or experiences, and identify a default refund contact. The auction platform further enables the administrator to enter specific details about the item or experience, such as a description of the item (including, for example, a description of how and why the item is a once-in-a-lifetime opportunity), how the item can be won (bidding, bidding via a "win now" price, or selecting a "buy now" selection without bidding), how many of that item or experience are available, whether the item or experience is sponsored and the sponsor, what the refund policy is for the item or experience and the refund contact, and any fine print regarding the item or experience. Additionally, the auction platform may enable management of advertisements, which may include specifying which ads are to run, the frequency with which the ads should run, the length of time each ad should run, the logo or advertisement to be displayed, and/or other details. The administrative tool may be used to customize the appearance of the auction platform to include, for example, certain logos or to have the header or footer be certain colors such as the team colors. The administrative tool may further be used to enter information about the various companies conducting auctions.

BRIEF DESCRIPTION OF THE DRAWINGS

FIGS. 14A-B illustrate an administrator list feature of an administrative tool of the auction platform system

DETAILED DESCRIPTION OF THE DRAWINGS

Figure 1:
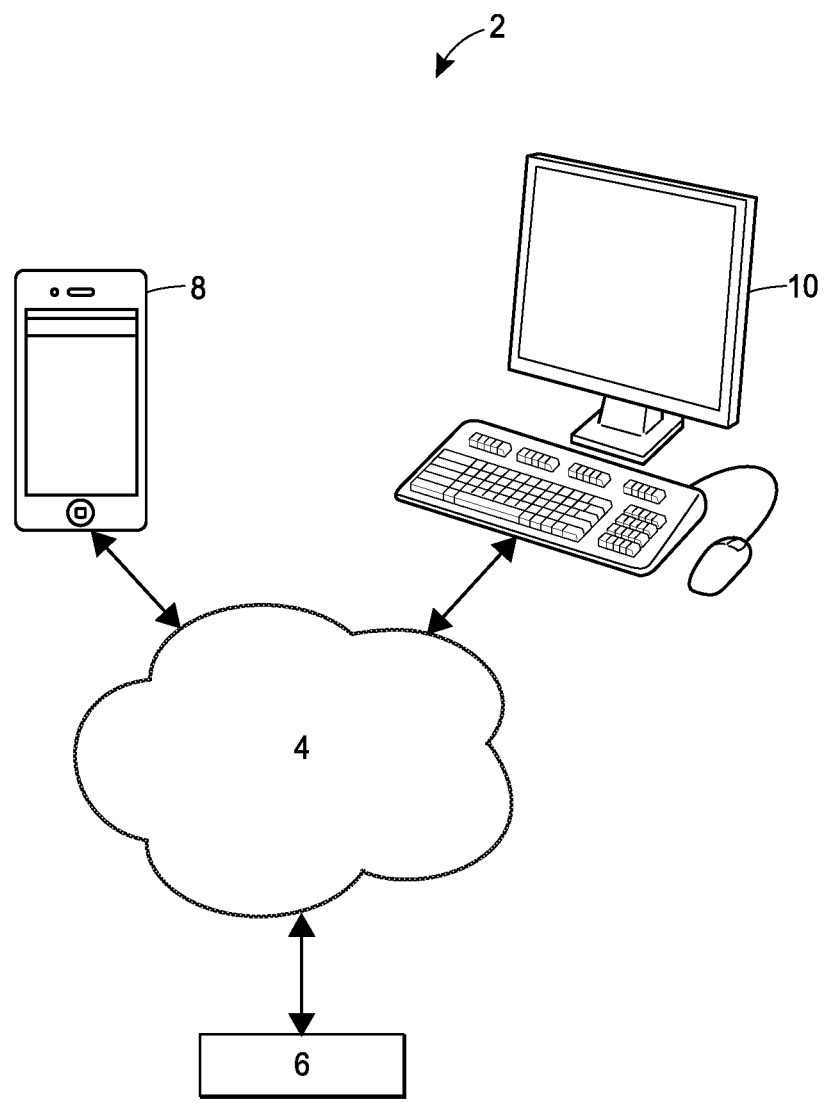
FIG. 1 is a schematic view of the connectivity of the auction platform.

FIG. 1 is a schematic view of a system 2 (i.e., an auction platform) configured to implement the systems and methods discussed herein. The system 2 may include a computer 10 configured to enable an administrator to configure and initiate auctions. The computer 10 may connect to one or more portable electronic devices 8 (including, but not limited to, smart phones, tablets, Personal Digital Assistants (PDA), multimedia players, desktop or notebook computers, MP3 players, and digital broadcast receivers) via a network 4. In embodiments, the network 4 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The network 4 may also be one or more private or local networks or dedicated frequency bands.

Figure 2:
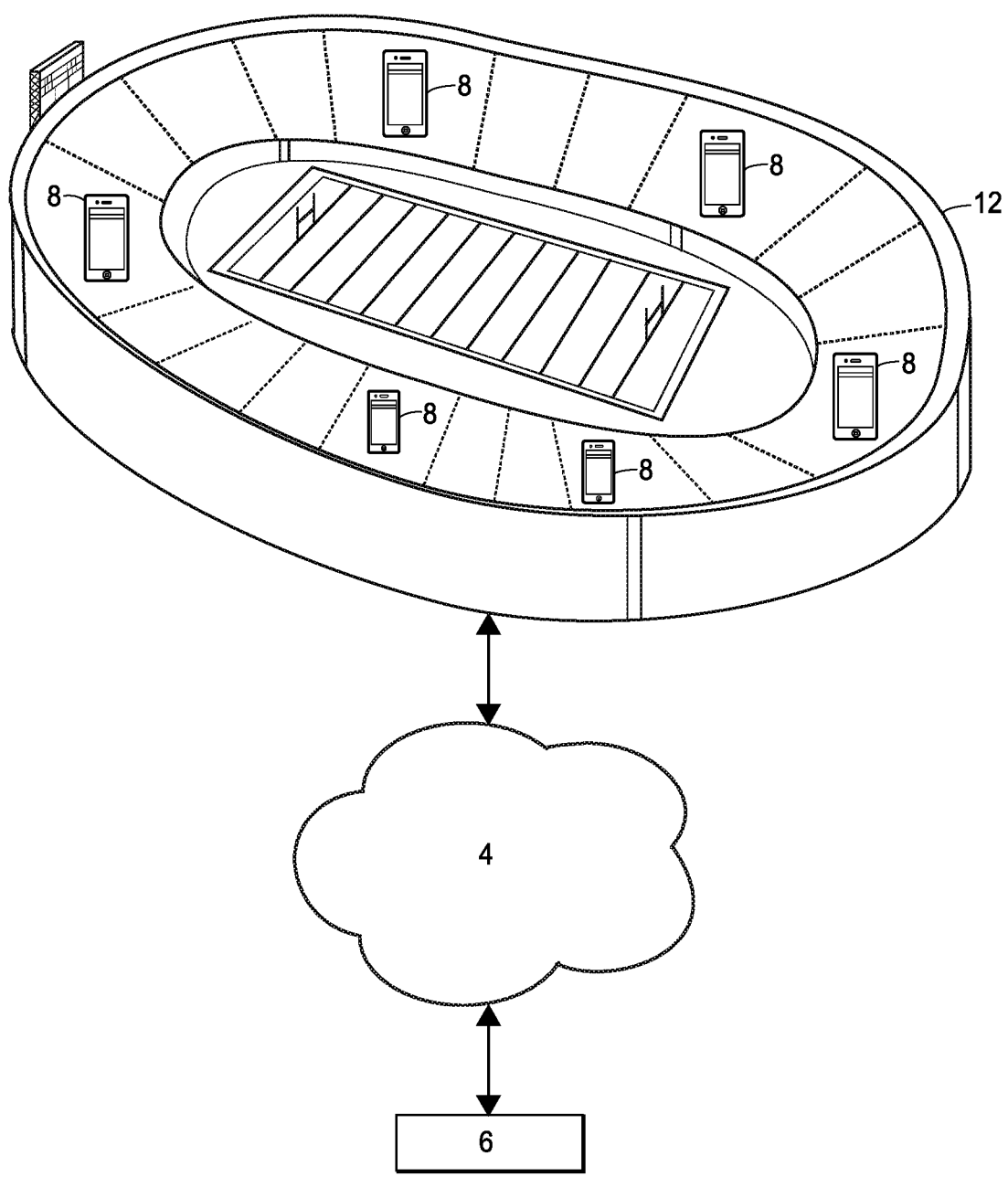
FIG. 2 is a semi-schematic overhead view of the auction platform in use in a venue.

FIG. 2 depicts an application of the system 2 in a venue 12. Attendees within the venue 12 (e.g., fans seated at a stadium) may access the server 6 and/or the computer 10 (not shown in FIG. 2) using respective portable electronic devices 8. In particular, the electronic devices 8 may access the server 6 and/or the computer 10 via the network 4, which in this case may a WLAN associated with the venue 12. As discussed in greater depth below, the computer 10 may enable administrators to initiate an auction by identifying items or services to be auctioned, inputting start and end times for the auction, and setting starting bids for the various items or services. Administrators may further use the computer 10 to prepare other engagement activities, such as trivia competitions. Attendees may use respective portable electronic devices 8 to connect to the computer 10 to view auctions, submit bids, submit payments, and participate in other engagement activities set-up by an administrator. In particular, attendees may bid on once-in-a-lifetime opportunities or experiences that they would not otherwise have the opportunity to acquire.

Figure 3:
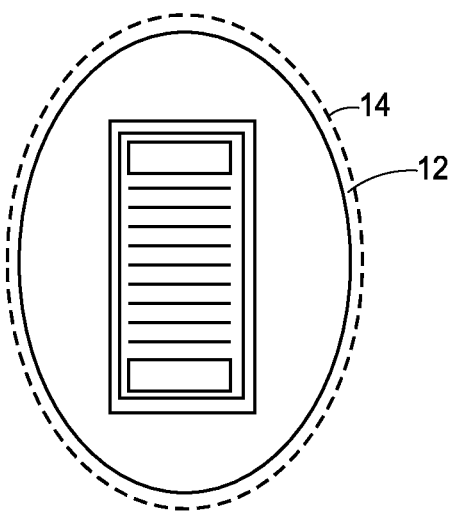
FIG. 3 is an overhead view of a venue illustrating use of the auction platform system that has been limited by geo-location to users of mobile devices within the venue.
Figure 4:
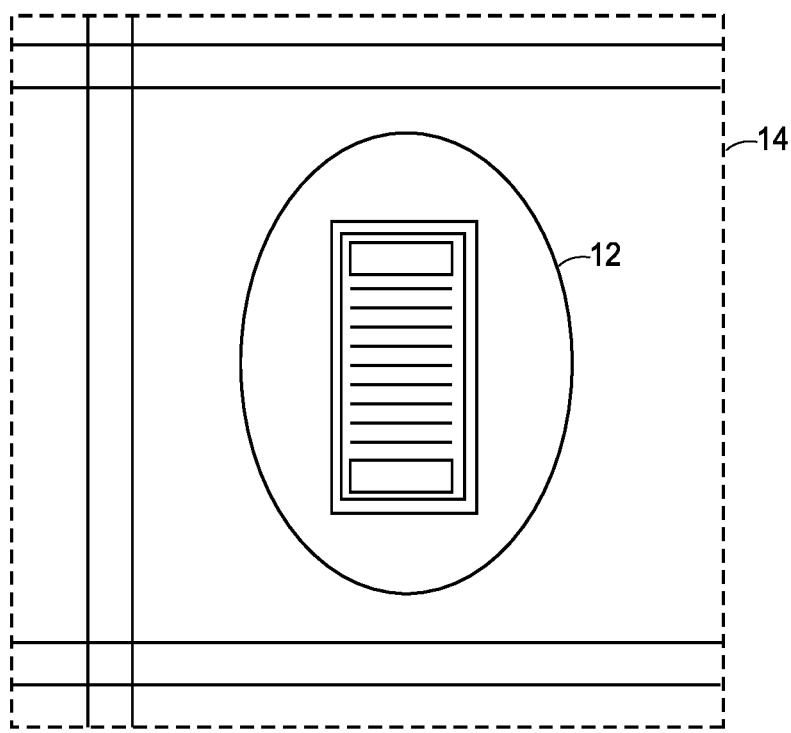
FIG. 4 is an overhead view of a neighborhood surrounding a venue illustrating use of the auction platform system that has been limited by geolocation to users of mobile devices within the neighborhood.

FIGS. 3 and 4 illustrate the geolocation features of the system 2, which may be configured and managed using various location technologies including global positioning system (GPS). It should be appreciated that the depicted venues in FIGS. 3 and 4 are merely exemplary, and that alternative and additional venues are appreciated.

FIG. 3 illustrates an overhead view of a sport stadium 12 which may host an event attended by attendees, where the attendees may participate in one or more auctions initiated by an administrator. According to embodiments, the administrator may configure an auction such only the attendees (or otherwise people located at the stadium 12) may participate in the auction. Accordingly, the administrator may specify a boundary 14 such that any device located within the boundary 14 may access the auction platform and any device located outside the boundary 14 does not have access to the auction platform. In some implementations, the auction platform may automatically identify or determine the boundary 14, such as if the stadium 12 has existing coordinates.

In operation, a device within the stadium 12 may request to access a specific auction, wherein the request may include a location of the device. The auction platform may determine whether the location is within or external to the boundary 14. If the location is within the boundary 14, the auction platform may enable the requesting device to access the auction. If the location is outside of the boundary 14, the auction platform may deny the requesting device access to the auction.

Similarly, FIG. 4 illustrates an overhead view of the sport stadium 12 with an alternative boundary 14. In the embodiment as shown in FIG. 4, the boundary 14 may include the premises of the stadium 12 itself as well as a neighborhood that surrounds the stadium 12. As described above, an administrator may interface with the auction platform to specify the boundary 14, such as via selecting certain areas or streets. In an embodiment, the auction platform may automatically determine the boundary 14.

Figure 5A:
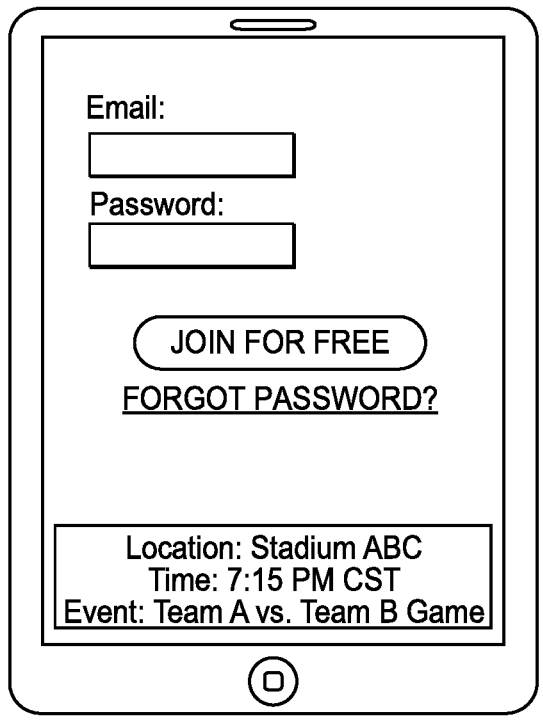
FIGS. 5A-5D illustrate self-registration and login features of a user tool of the auction platform system.
Figure 5B:
Figure 5C:
Figure 5D:
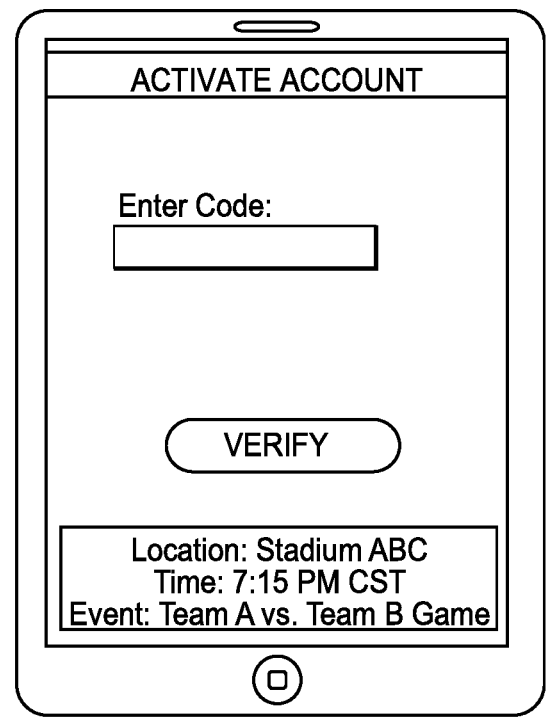

FIGS. 5A-9D depict example interfaces associated with the auction platform, where the interfaces may be displayable by the portable electronic device 8. According to embodiments, the portable electronic device may be located within a venue at a time when an event is taking place. FIG. 5A is a login screen that enables a user to login by entering their email address and password, click on a link to reset a password if the user has forgotten his/her password, or else click on a link to join for free if the user is new to using the auction platform. FIG. 5B is an interface that enables a user to self-register by entering their email address, entering a password, confirming the password, and providing a mobile number at which they may be reached. FIG. 5C is an interface that, upon receiving registration information from a user, enables the user to determine whether they would like to receive an activation code via text or via email. FIG. 5D is an interface that enables a user who has received an activation code to enter it in order to complete the self-registration process. As discussed herein, the self-registration features supported by the auction platform enables massive amounts of individuals to register for access to auctions. For example, some venues host football games that draw over 100,000 fans.

Figure 6A:
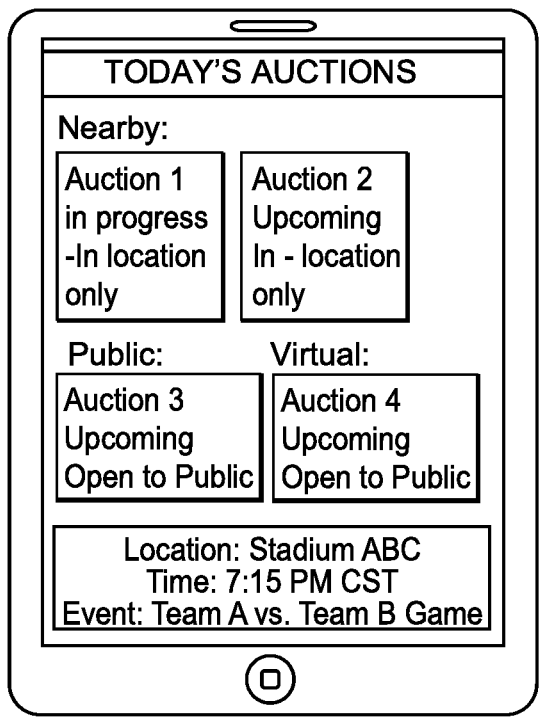
FIGS. 6A-6D illustrate auction selection, item selection, and bidding features of a user tool of the auction platform system.
Figure 6B:
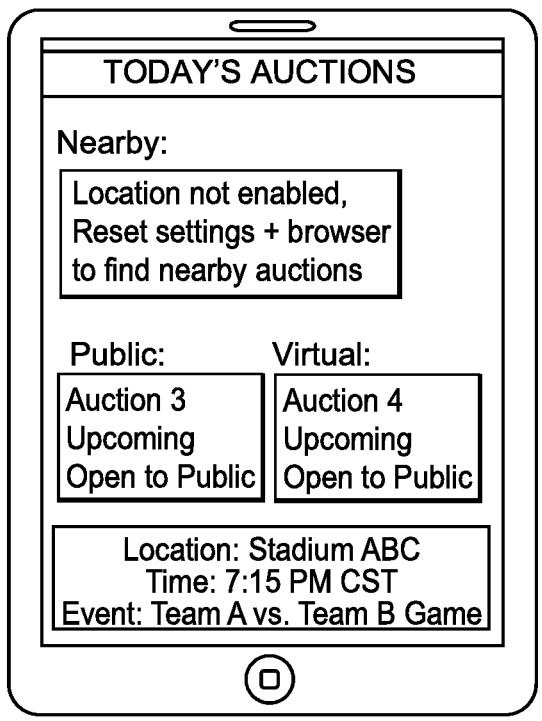

FIG. 6A is an interface that enables a user to access and review nearby auctions, public auctions, and virtual auctions in order to select the auction in which they would like to participate. In order for nearby auctions to be displayed, the portable electronic device 8 of the user must have settings that enable the location of the portable electronic device 8 to be determined. In the event that the settings do not allow the location of the portable electronic device 8 to be determined, users are prompted via an interface, such as the interface, as illustrated in FIG. 6B. In particular, the interface of FIG. 6B indicates that the settings need to be adjusted to enable location tracking of the portable electronic device 8 in order to locate nearby auctions.

Figure 6C:
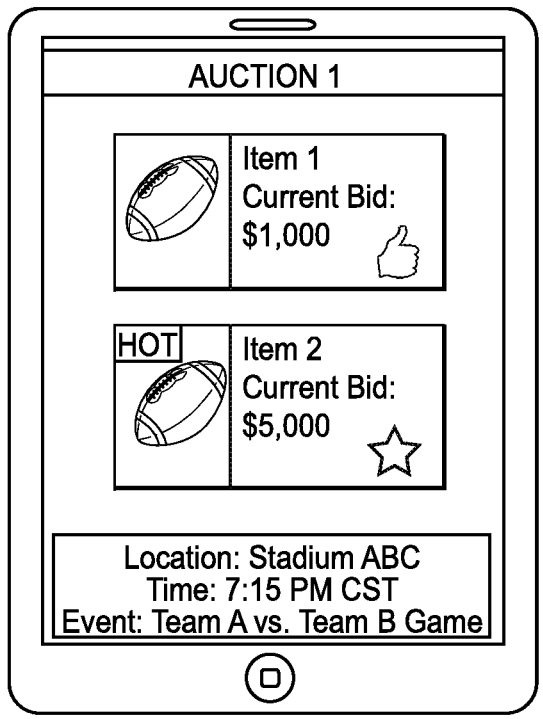
Figure 6D:
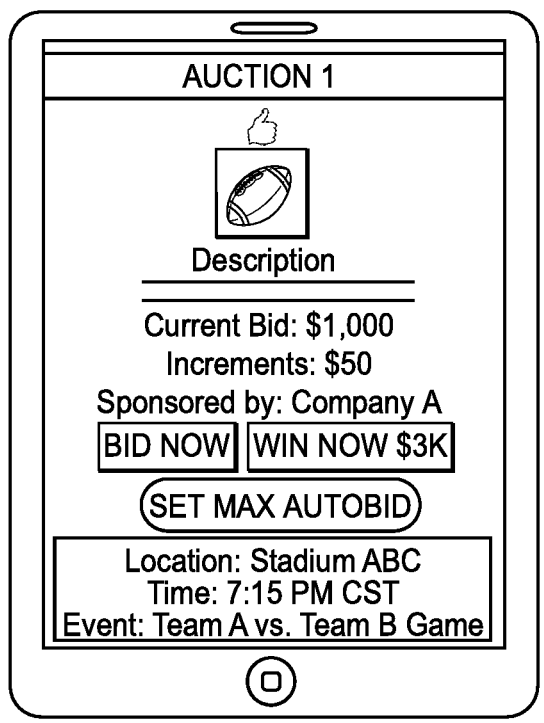

After a user selects an auction, the portable electronic device 8 may present the user with a list of items being sold in that auction, as pictured in the interface of FIG. 6C. As shown in FIG. 6C, certain items may be marked as "hot." The determination of whether an item qualifies as hot may be made on the basis of how many bids it has, how many users have viewed it, or some other metric. In addition, indications or icons (e.g., a thumbs up sign, a gold ribbon, or a star) may be used to indicate that the user is winning an auction, has won an auction, or may otherwise be selected by the user to indicate that the item is a favorite. If a user is interested in an item, the user may select the item, and the portable electronic device 8 may display the interface shown in FIG. 6D, which provides information about the item, such as a description of the item, the sponsor of the item, the current bid on the item, and the increments by which the bid may be increased. The interface of FIG. 6D may also enable the user to bid one increment above the current bid, to set a maximum auto bid, or to purchase the item at a "win now" price. Indications or icons (e.g., a thumbs up sign, a gold ribbon, or a star) may also be used on this interface to indicate that the user is winning an auction, has won an auction, or has selected the item as a favorite. The image of the item displayed on the interface of FIG. 6D may be reused throughout the auction platform for the item, being resized based on the sizing requirements for each interface display of the item.

Figure 7A:
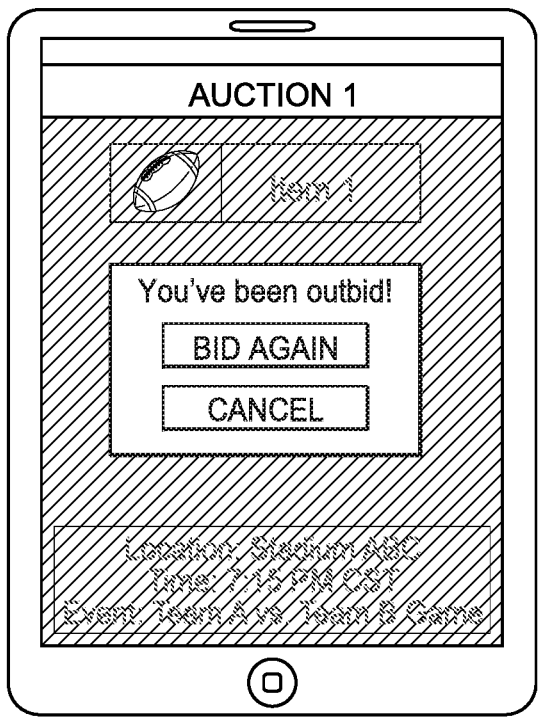
FIGS. 7A-7D illustrate bidding result reporting features of a user tool of the auction platform system.
Figure 7B:
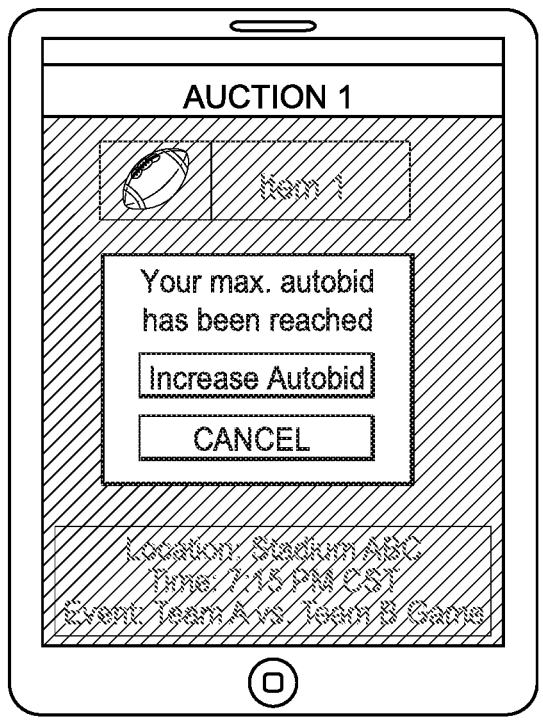
Figure 7C:
Figure 7D:
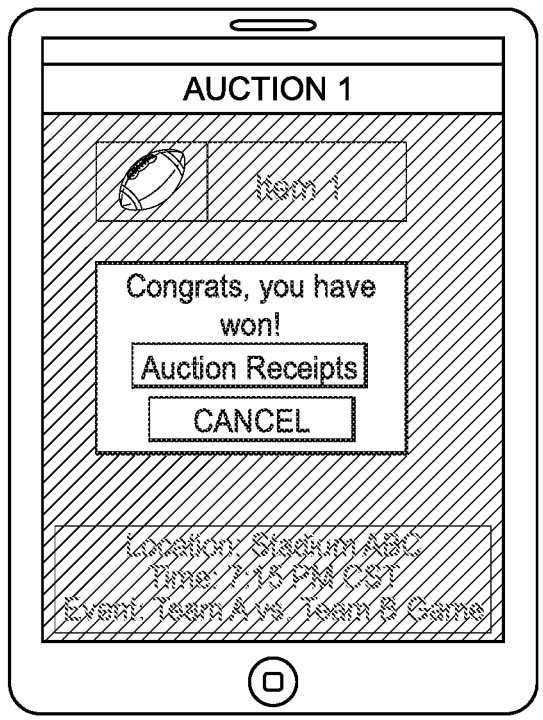

If the user places a bid, the auction platform may ensure that the user is notified of the status of the bid. For example, FIG. 7A is an interface that informs a user that he or she has been outbid and encourages the user to bid again. FIG. 7B is an interface that informs a user that the user's set maximum auto bid has been reached and offers the user the opportunity to increase the maximum auto bid. FIG. 7C is an interface that informs a user they have not won an auction. FIG. 7D is an interface that informs a user they have won the auction and provides a link to additional details that may include how to pay or how to redeem a receipt to receive the item.

Figure 8A:
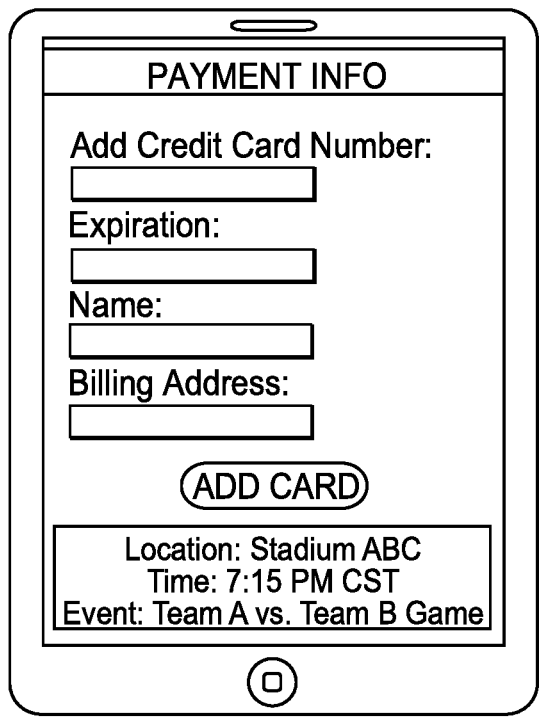
FIGS. 8A-E illustrate payment features of a user tool of the auction platform system.
Figure 8B:
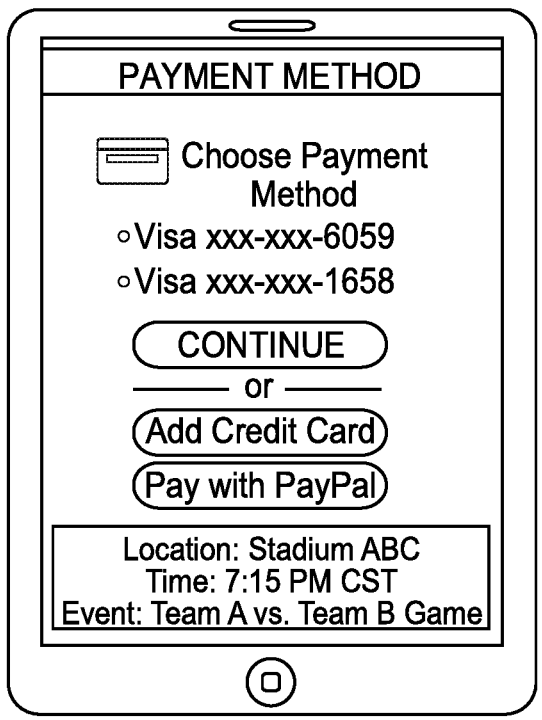
Figure 8C:
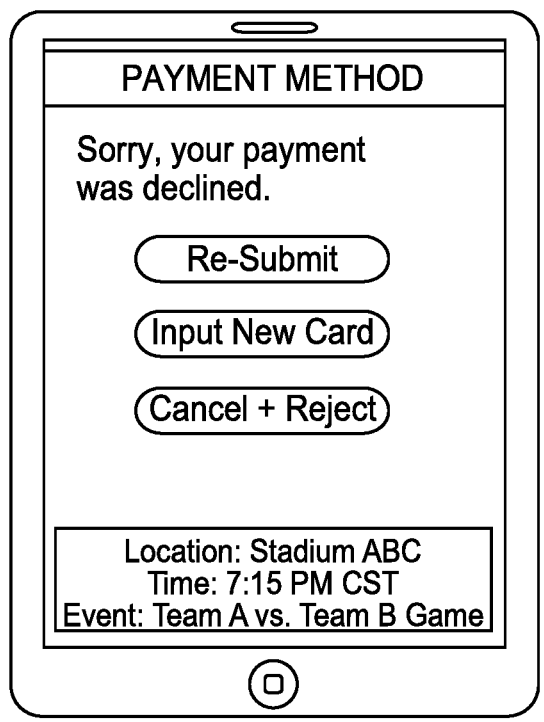
Figure 8D:
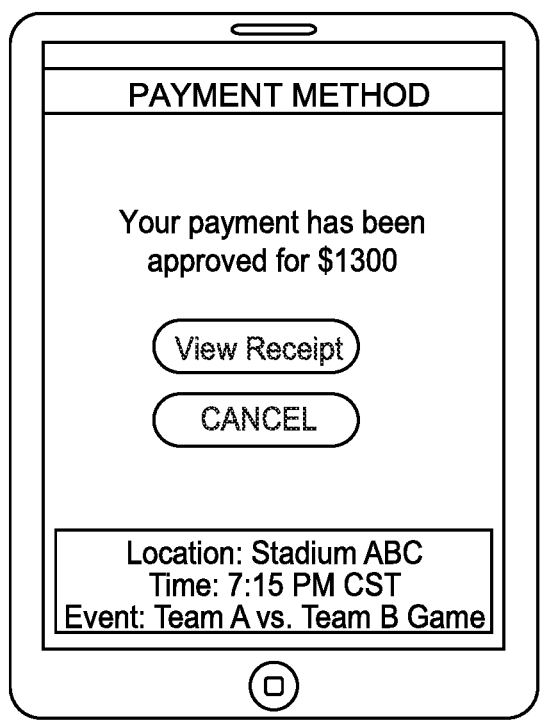

FIGS. 8A-E illustrate various interfaces associated with payment features of the auction platform. FIG. 8A is an interface that enables a user to add a credit card to their account by entering the cardholder name, number, billing zip code, and any other relevant information. Users may provide information for multiple credit cards. FIG. 8B is an interface that enables a user to select which credit card to use to make a payment. FIG. 8C is an interface that informs a user that their payment has been declined and gives them the option to re-submit or input a new card. FIG. 8D is an interface that informs a user that their payment has been approved and provides a link to a receipt for the payment. The receipt may be used for tax purposes. When a user's payment is approved, the auction platform automatically deposits the payment into a bank account.

In general, a customer, such as a professional sports team or a venue owner, may pay an auction administrator to host an auction using the auction platform. Such customers are generally the entities providing items for auctions occurring on the auction platform. As a result, a need exists for a channel by which a customer can be quickly and directly reimbursed for auction items from the auction platform users, as opposed to administrators receiving payments from users and then making a bulk payment to a customer. The auction platform allows a user's payment to be deposited directly into a bank account of a customer so that there is no lag time between the payment by the user and the receipt of the payment by the customer.

Figure 8E:

FIG. 8E is an interface depicting a receipt for winning an auction, which may include information such as the cost of the item, the date it was won or purchased, a redemption code, the sponsor of the item, and a link to mark the item as redeemed. A user of the auction platform can simply show the receipt to an auction agent in order to redeem the receipt for the won item or experience. The auction agent may select a redeem button in order to prevent the same prize from being redeemed multiple times. The receipt may be used for tax purposes.

Figure 9A:
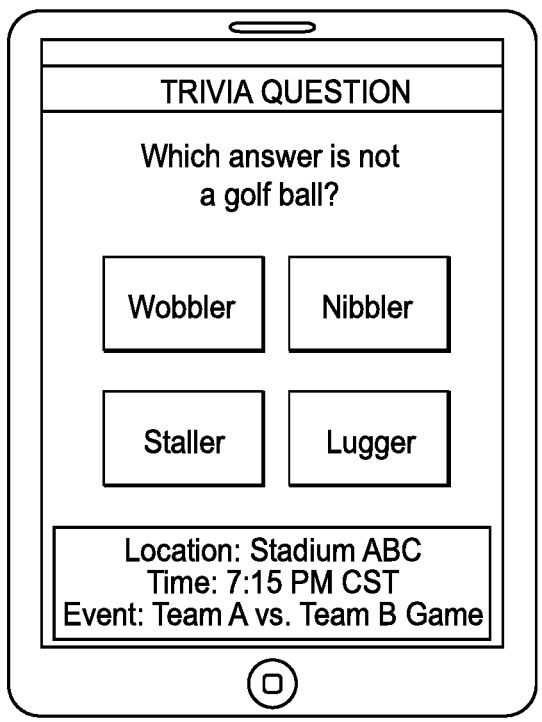
FIGS. 9A-D illustrate illustrates trivia features of a user tool of the auction platform system.

FIGS. 9A-9D are interfaces illustrating trivia features associated with the auction platform. FIG. 9A is an interface that asks a user a trivia question and enables the user to select an answer. The amount of time the user has to select the answer may be varied. Trivia questions may optionally be directed to the event the user is attending or a participant of the event in order to increase the user's engagement with the event and/or the participant.

Figure 9B:
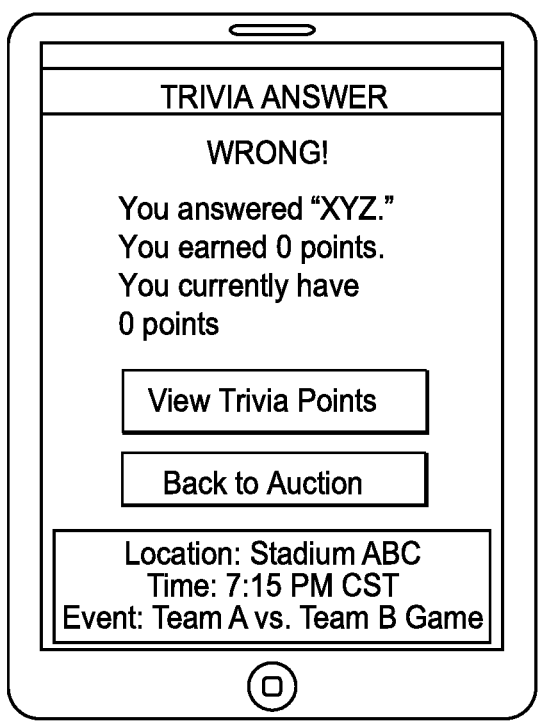
Figure 9C:
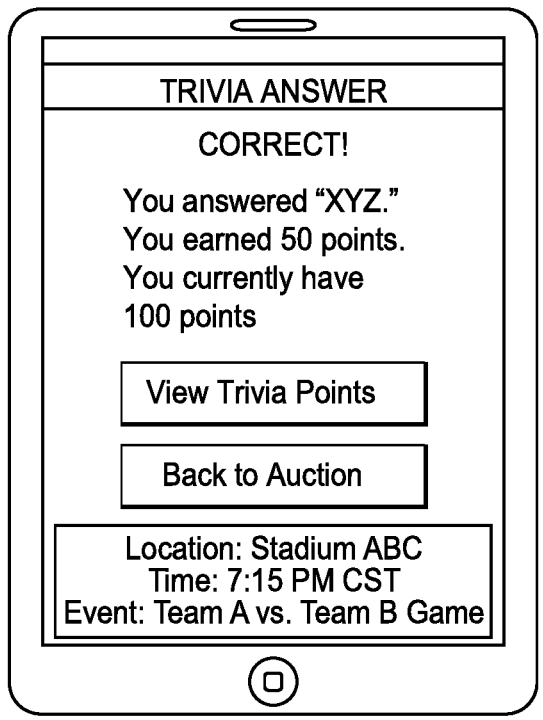
Figure 9D:
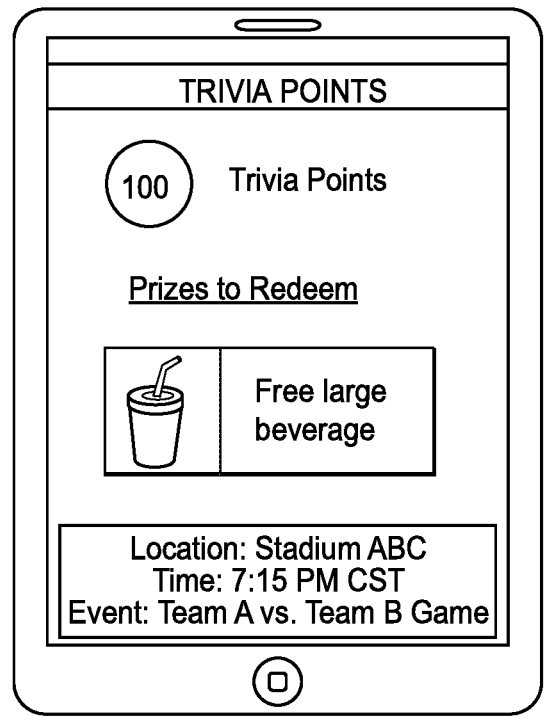

FIG. 9B is an interface that informs a user that they answered a trivia question incorrectly, informs the user how many trivia points they have accumulated so far, and provides a link to go back to the auction features of the auction platform and another link to view a current amount of accumulated trivia points. FIG. 9C is an interface that informs a user that they answered a trivia question correctly, indicates how many points or what prize is awarded for the correct answer, and provides a link to go back to the auction features of the auction platform and another link to view a current amount of accumulated trivia points or prizes that can be redeemed. FIG. 9D is an interface that shows the user the current amount of accumulated trivia points and the options that they may be redeemed for. For example, trivia points may be redeemable for items at a refreshment stand in the stadium 12.

In some embodiments within the scope of the present disclosure, the auction platform may enable users using the trivia features or the auction features to input their seat number or the section in which they are sitting. The auction platform may then cause a display device (e.g., a screen within the venue) to display, for example, the section of the venue that has answered the most trivia questions correctly or the location of the highest bidder on an auction item. Knowledge of which section is winning or where a winning bidder is located may motivate other users to interact with the auction platform.

FIGS. 10-14B illustrate various interfaces associated with certain functionalities associated with an administrator of the auction platform. According to embodiments, a computer such as the computer 10 may display the interface, however it should be appreciated that an interface may access the interfaces using any type of electronic device. As described herein—the auction platform enables an administrator to configure and manage auctions and other engagement activities for various customers, such as sports teams wishing to use the auction platform at their events.

Figure 10:
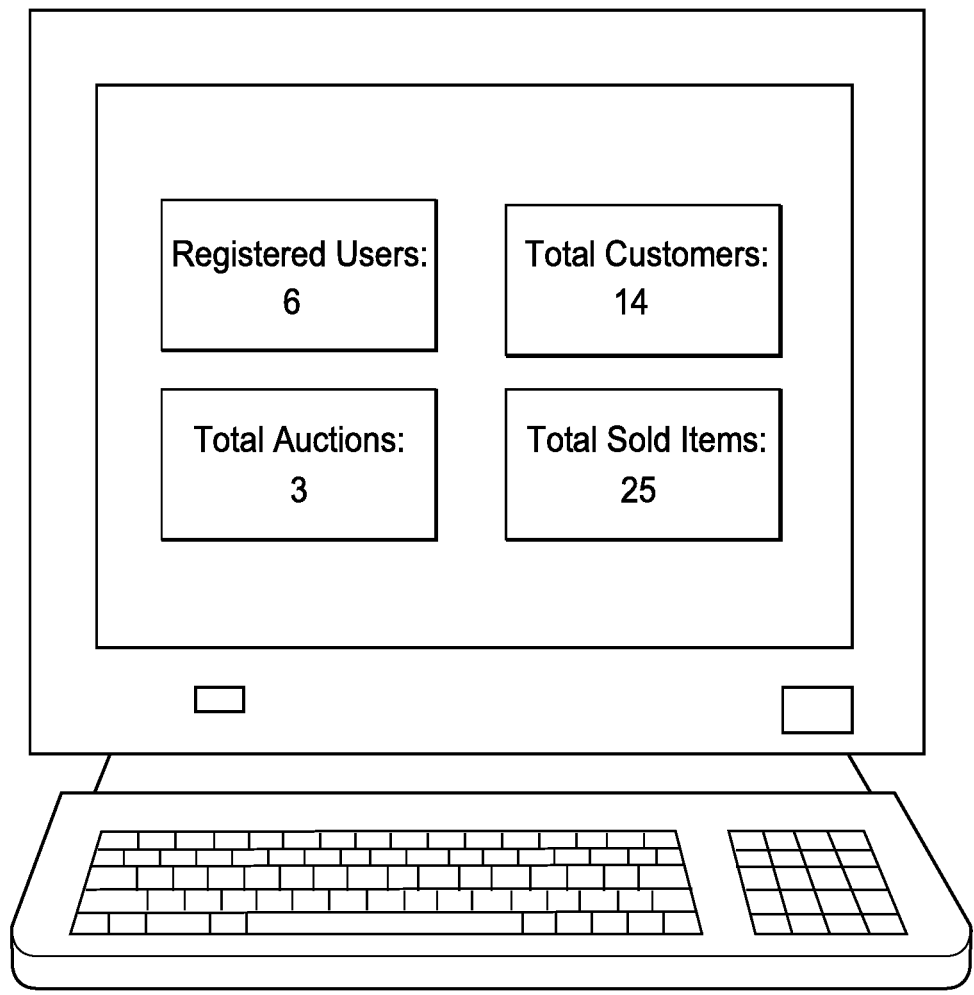
FIG. 10 illustrates a dashboard feature of an administrative tool of the auction platform system.

FIG. 10 illustrates a dashboard feature of the auction platform that provides general information about how the auction platform is being used. In particular, the dashboard feature of FIG. 10 identifies the number of registered users, the number of total customers, the number of total auctions, and the number of total sold items. In addition to cumulative data, the dashboard may show real time results associated with live or current auctions.

Figure 11A:
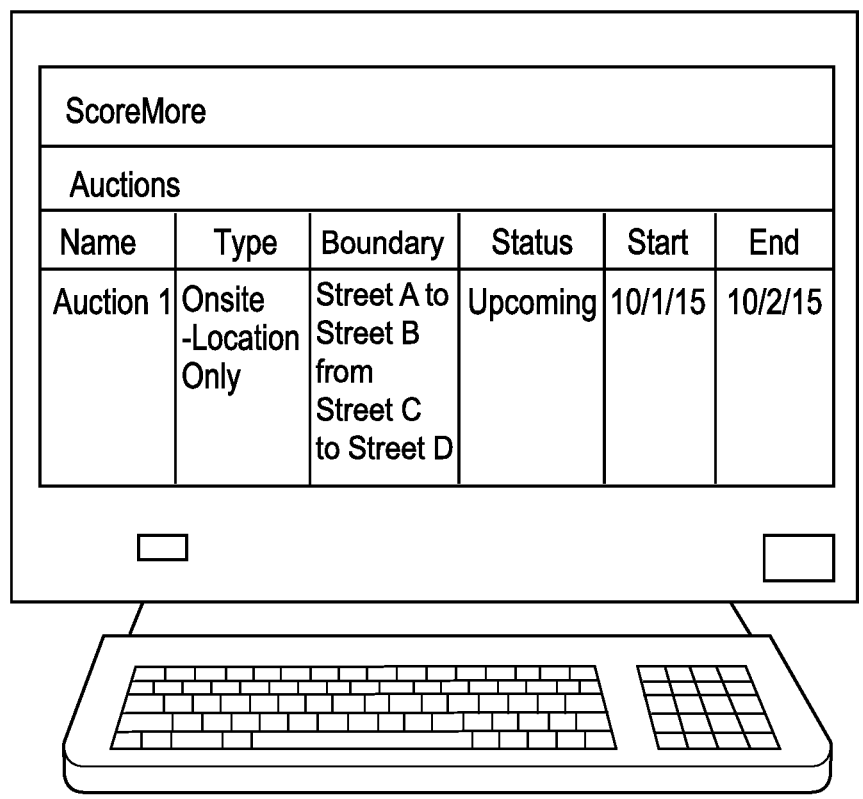
FIGS. 11A-D illustrate auction features of an administrative tool of the auction platform system
Figure 11B:
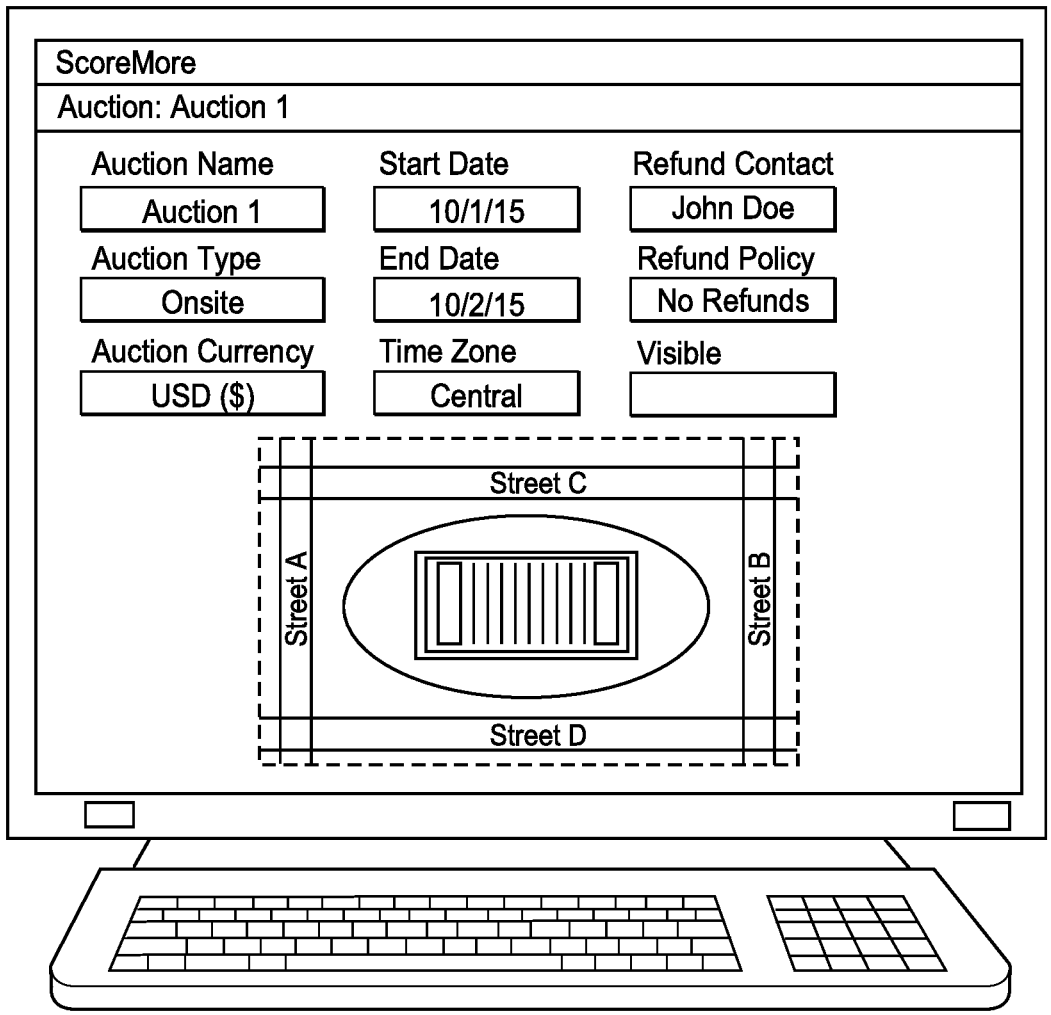

FIGS. 11A-D illustrate additional administrative features of the auction platform. FIG. 11A is an interface that provides a list of auctions, their type (on-location only or open), their status (past, currently occurring, or upcoming), their start date, their end date, and the boundary line 14 defining where participation in the auction is allowed. FIG. 11B is an interface that details information about an auction, such as the auction name, type (on-location and locked from public outside venue, on location but open to public outside the venue, or virtual worldwide and open to the public), start and end dates, auction currency, time zone of the auction, default refund contact, and default return policy, all of which may be input into the auction platform. In some embodiments, a default setting may govern all items within the auction unless an alternate designation is made for a particular item. In addition, an auction may be made visible to the public prior to the beginning of an auction in order for potential bidders to peruse items for the auction. Otherwise, the auction may be kept invisible. Information about the boundary line 14 of the auction may also be input, and a map may display the area encompassed by the boundary line 14. The auction may be locked so that only users within the boundary 14 can access the auction. Otherwise, the auction may be unlocked so that users outside (and within) the boundary 14 may access the auction.

Figure 11C:
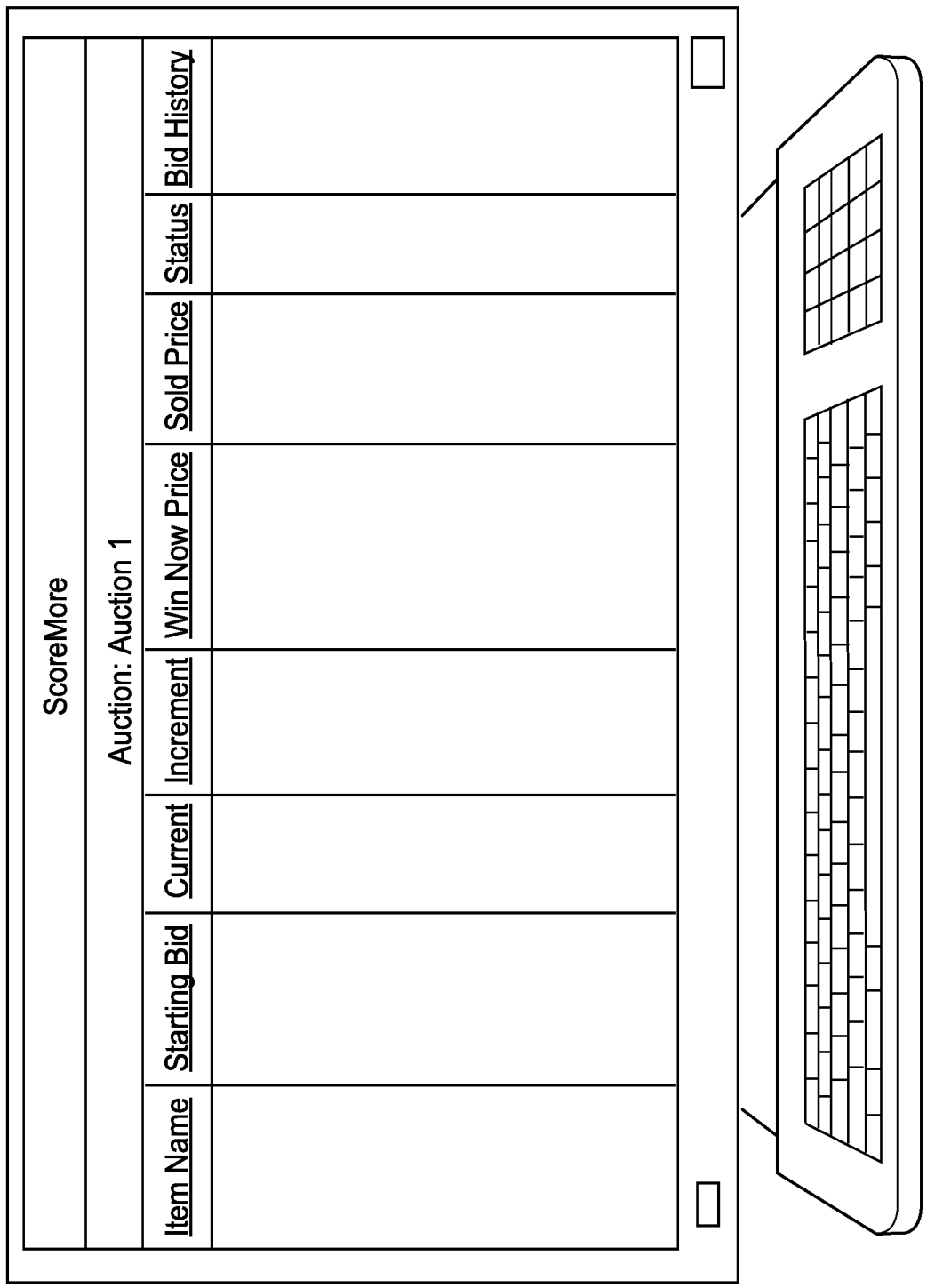
Figure 11D:
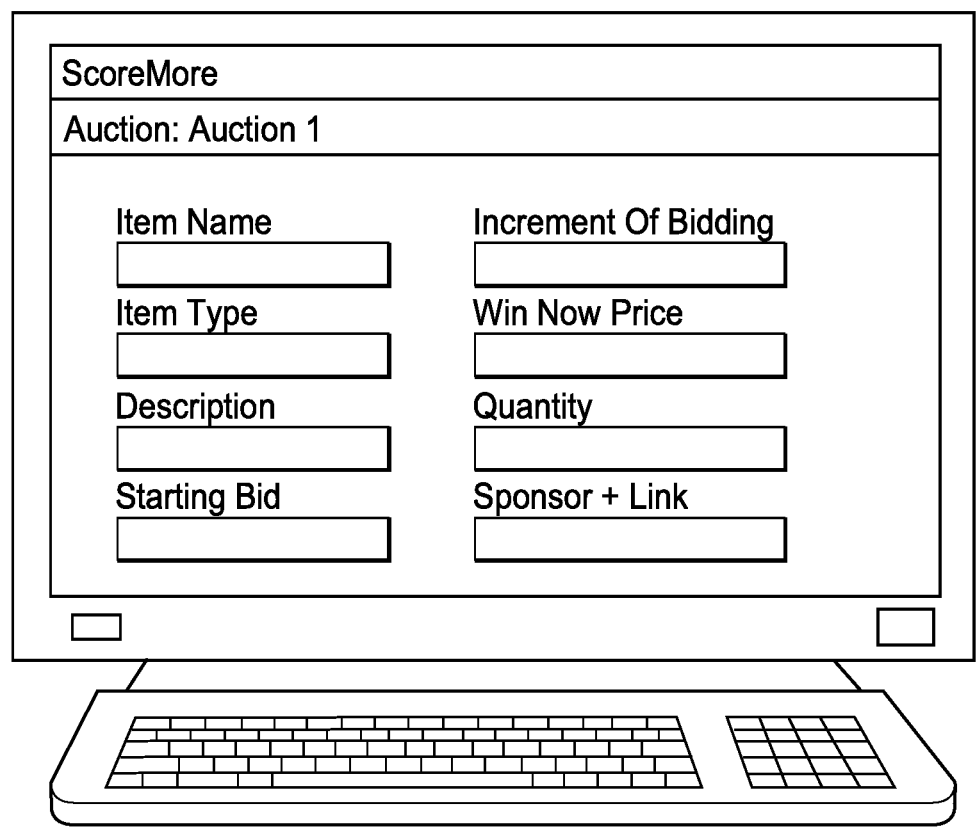

According to some embodiments, certain auctions or items may be classified as "hot" based on a larger amount of activity for that auction. In other embodiments, an administrator may designate an auction or an item as "hot" before the auction is initiated. An administrator can also specify which information associated with an auction is visible to accessing users. FIG. 11C is an interface that provides details about each item in an auction, such as the starting bid, the current bid, the increment at which bidding occurs, any "win now" or "buy now" price, the bid history, the sold price if available, and the status of the item (e.g., no activity, active, sold). FIG. 11D is an interface that enables an item or experience to be added to an auction. Information about the item or experience, such as its name, description, type (bid only, bid or buy at a "win now" price, or "buy now" sans bidding), starting bid, increments at which bid price can be increased, a "win now" or "buy now" price if available, the quantity of that item available, the sponsor for the item and a link to the sponsor, the refund policy and refund contact for the item, and any fine print about the item.

Figure 12B:
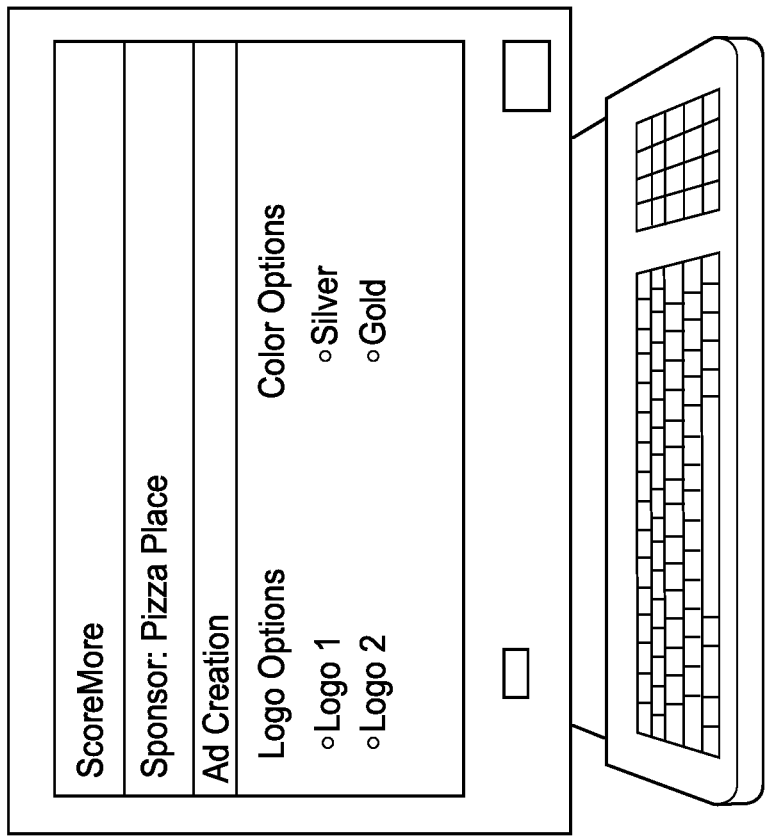
FIGS. 12A-B illustrate advertising and/or sponsorship features of an administrative tool of the auction platform system
Figure 12A:
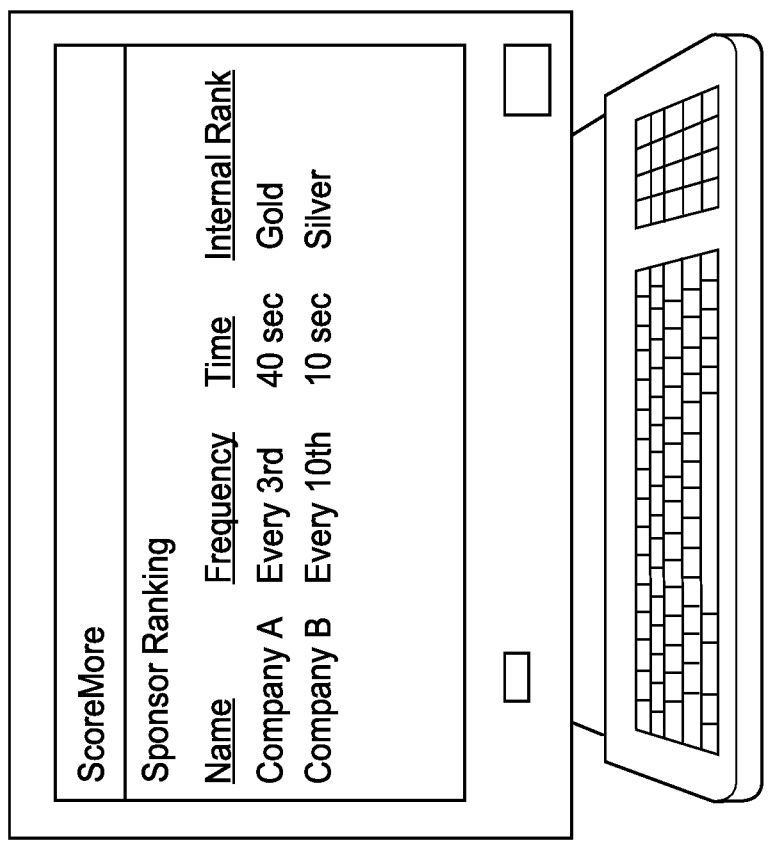

FIGS. 12A-B illustrate advertising and/or sponsorship features associated with the auction platform. FIG. 12A is an interface that provides a list of advertisements, the associated sponsor, the ranking of the sponsor, and the date the advertisement was created. In an embodiment, advertisements may be displayed as a screen saver when a user is not actively accessing the auction platform. The auction platform ranking of the sponsor may be based on the frequency with which the ad is displayed within the rotation of all of the ads during the time the screen saver is being displayed or the time that the ad is displayed during the time the screen saver is being displayed. The sponsor may also be ranked based on an internal ranking of the sponsor by the customer based on their existing methodology (e.g., a designation of the sponsor as gold, silver, or bronze). Advertisements may be displayed in connection with items in an auction, and a hyperlink to each sponsor's web site may be provided in connection with each item.

The auction platform may be equipped to handle various types and combinations of advertisements from various combinations of advertisers. FIG. 12B is an interface the enables an administrator to input details about a sponsor. A list of sponsors and details about each sponsor may be maintained in a sponsor library, and particular sponsors may be selected as sponsors for particular auctions. In some implementations, sponsors may elect to pay a premium amount to have their advertisements highlighted or featured in the auction platform.

Figure 13B:
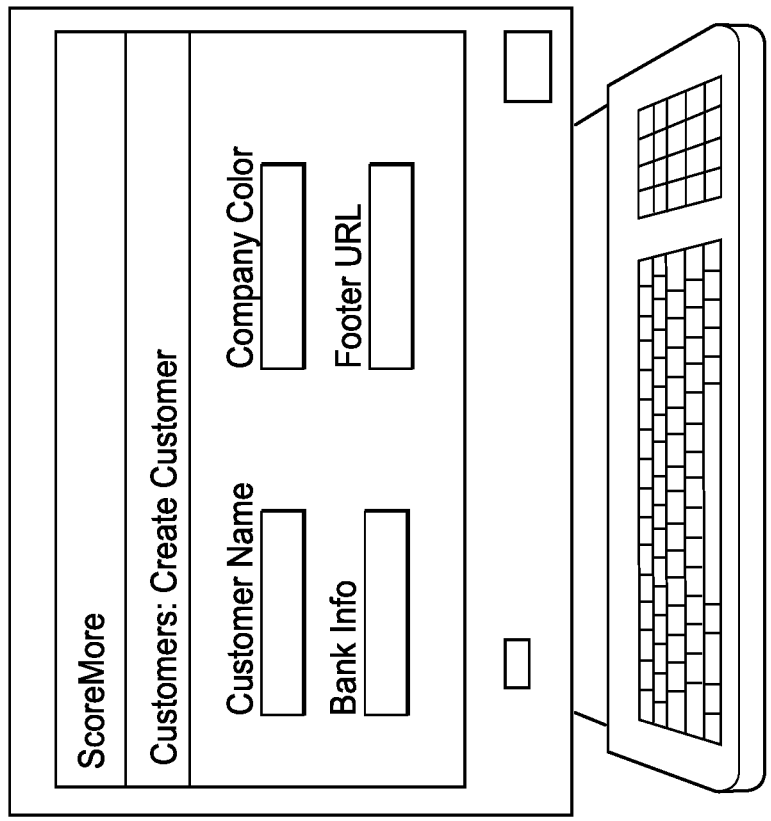
FIGS. 13A-B illustrate a customer list feature of an administrative tool of the auction platform system
Figure 13A:
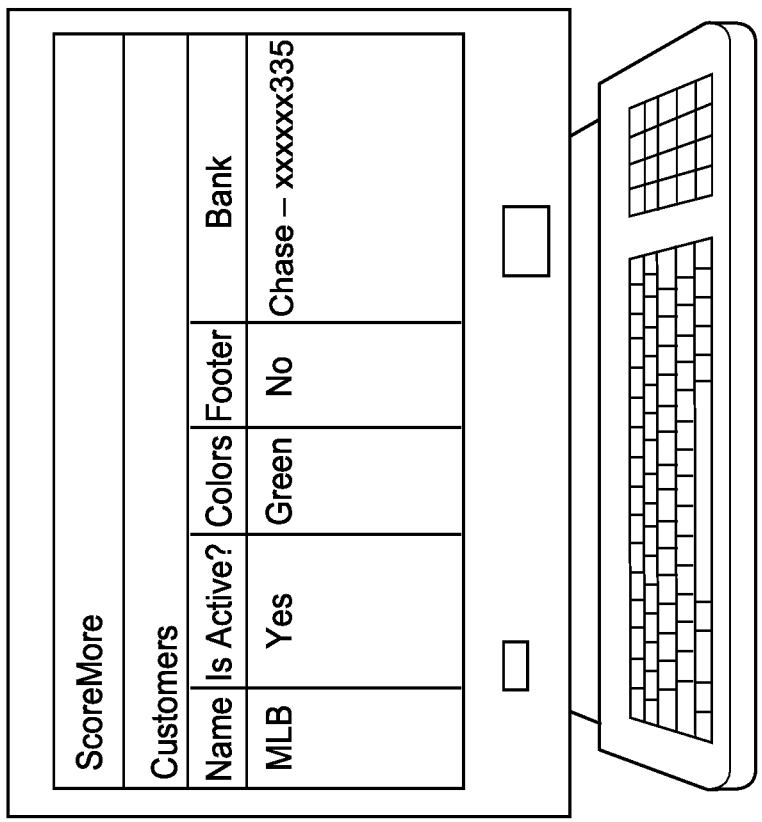

FIGS. 13A-B illustrate additional features accessible to administrators or customers of the auction platform. FIG. 13A is an interface associated with the various customers with current or past auctions through the auction platform. The list illustrated in FIG. 13A identifies customers by name, indicates whether they are currently active, and indicates customized display features that customer has selected within the auction platform. For example, a customer may select to have two different colors (e.g., team colors) be used to customize the appearance of the auction platform and may select to have footer features displayed. The footer may include the ability to download a mobile device application directly through the auction platform, which represents an advantage to customers who wish to promote their team or organization through their own application. The customer may also upload a logo into the auction platform, which can be included on user receipts as another feature to increase the customer's relationship with users. In addition, the customer may have an associated bank account. FIG. 13B is an interface that enables the customer to enter various information, such as the customer name, colors, bank information, footer banner URL, and contact information for a person who will handle various functions (e.g., marketing, prize redemption, or returns) for that customer.

FIGS. 14A-B illustrate additional administrator features associated with the auction platform. FIG. 14A is an interface that provides a list of current administrators, their names, work phone numbers, mobile phone numbers, email addresses, and status (active or not). FIG. 14B is an interface that enables administrator information to be changed. For example, the administrator may modify access or security settings, as well as input name, phone numbers, contact information, and passwords. Different administrators may have different levels of access to the functionality and security of the auction platform.

Figure 15A:
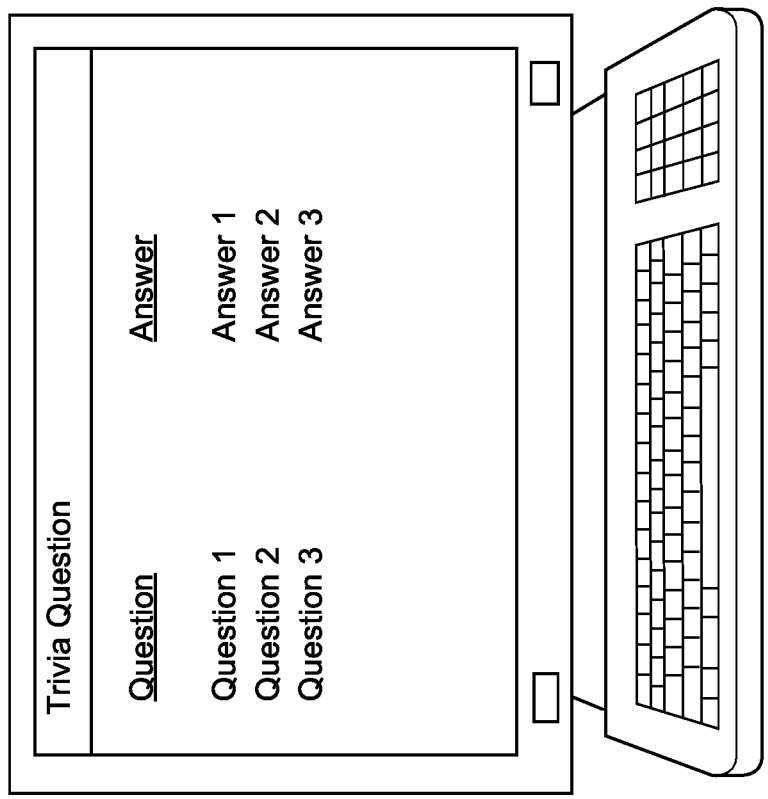
FIGS. 15A-H illustrate trivia features of an administrative tool of the auction platform system.
Figure 15B:
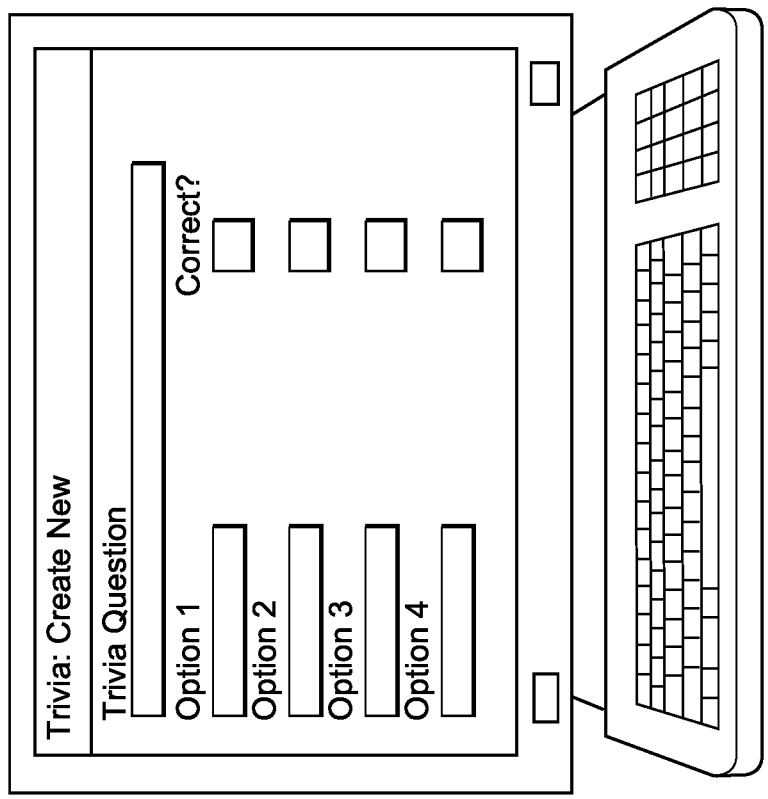
Figure 15D:
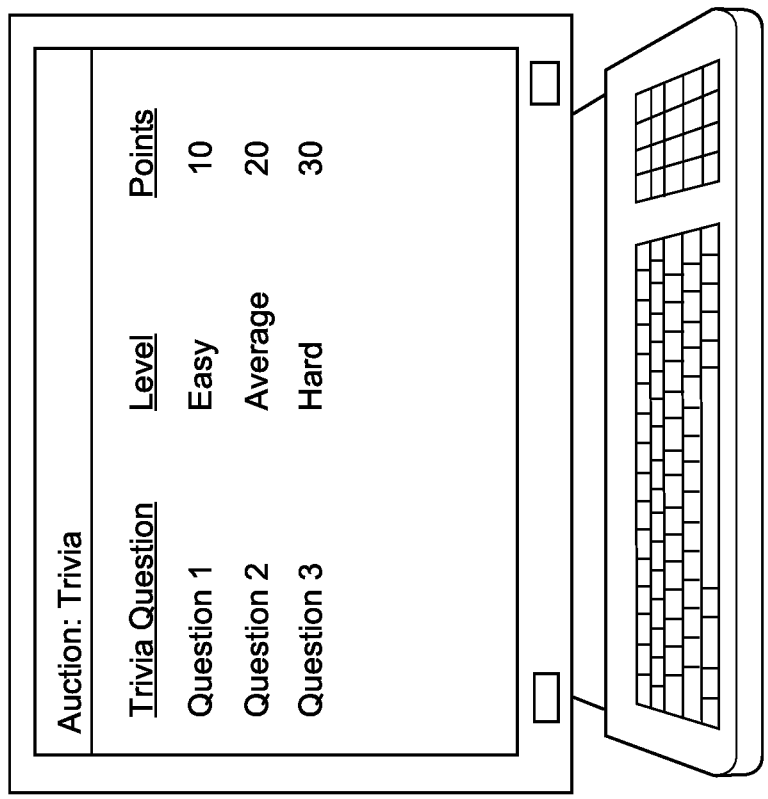
Figure 15C:
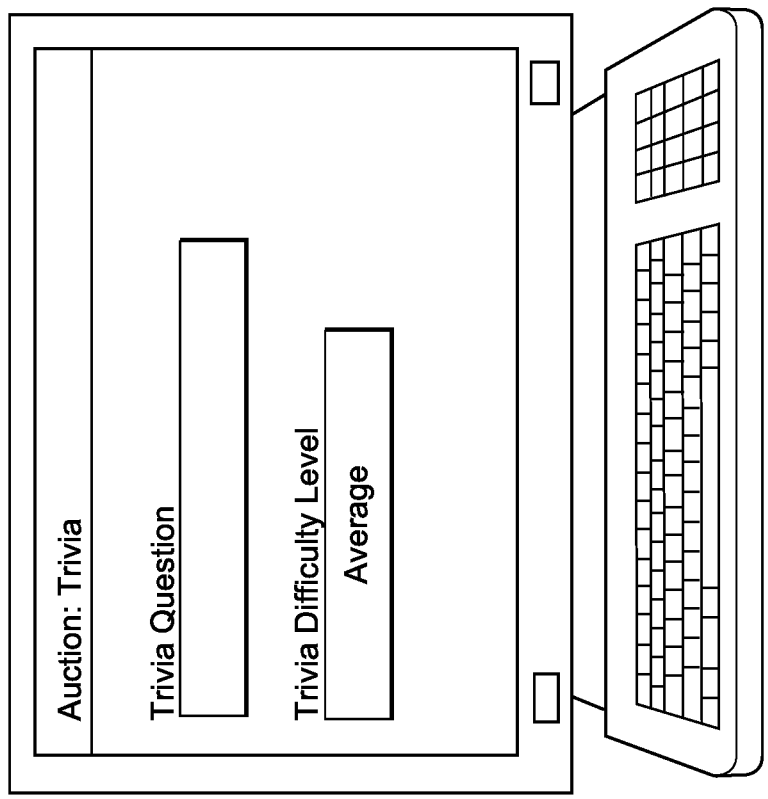
Figure 15F:
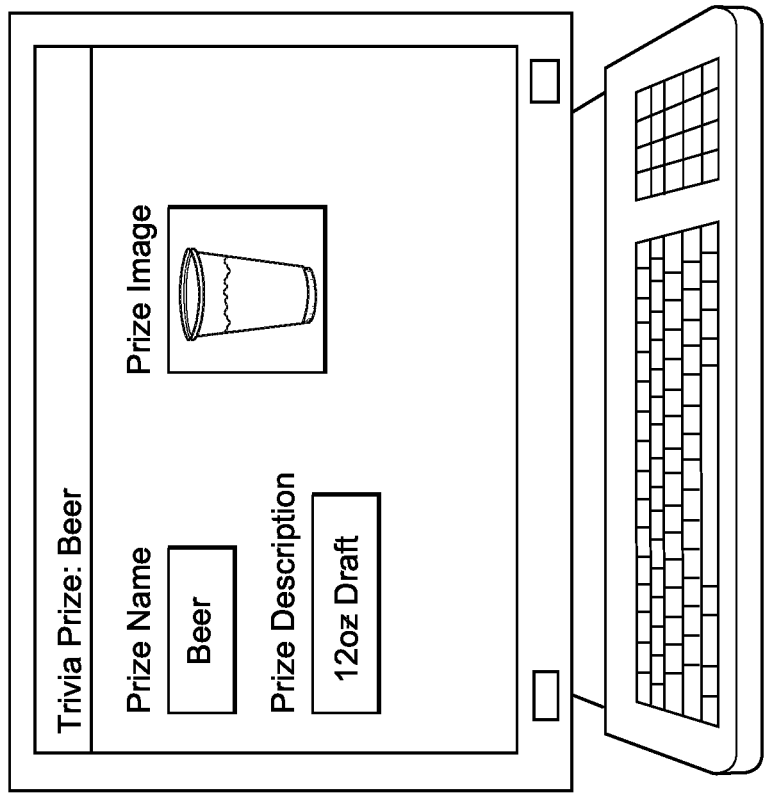
Figure 15E:
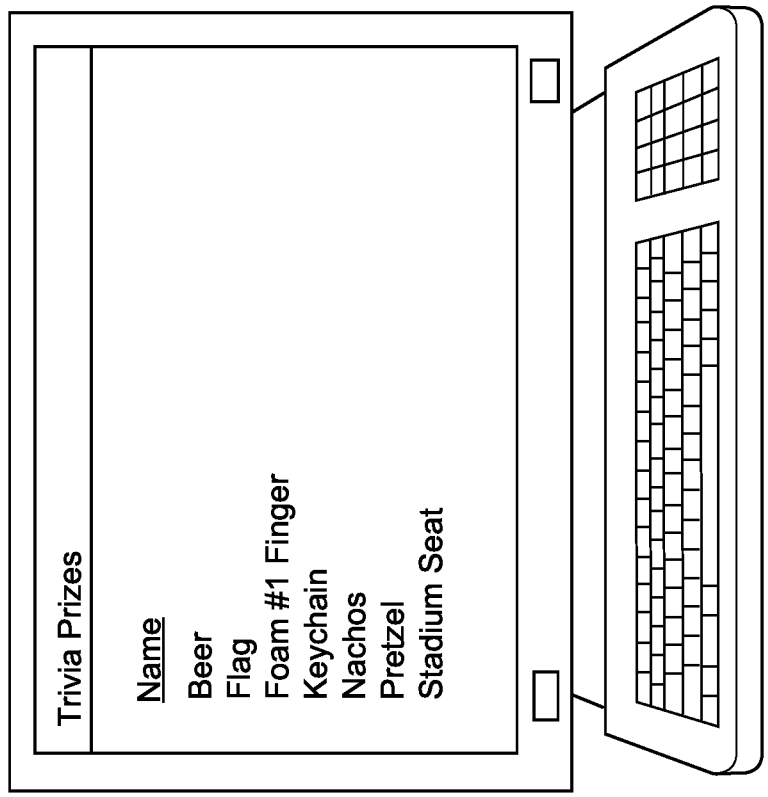
Figure 15H:
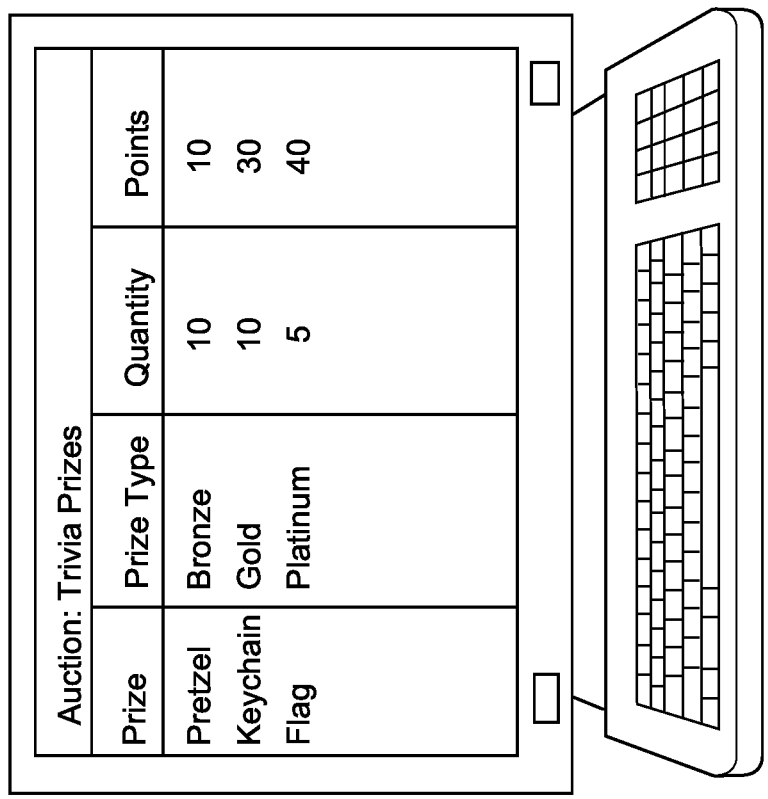
Figure 15G:
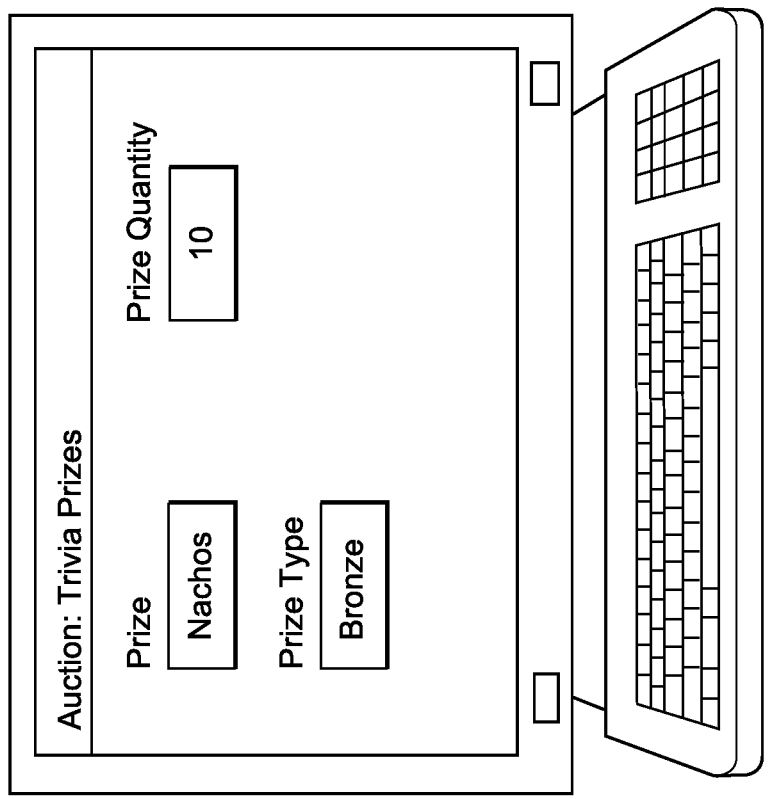

FIGS. 15A-H illustrate administrative trivia features associated with the auction platform. FIG. 15A is an interface that allows a trivia question and correct and incorrect questions to be entered. FIG. 15B is an interface of a library of entered trivia questions, which may be selected for use in any given auction. FIG. 15C is an interface of a trivia question selected for an auction that allows the difficulty level of the trivia question to be set. FIG. 15D is an interface of trivia questions selected for an auction with a chart displaying their difficulty level and point value. FIG. 15E is an interface of a library of potential trivia prizes, which may be selected for use in any given auction. FIG. 15F is an interface that allows details about a prize in the library to be entered, including an image of the prize that may be resized and used throughout the auction platform in connection with the prize, and a description of the prize. FIG. 15G is an interface of a trivia question selected for use in a particular auction that allows the prize to be identified as a certain type (i.e., gold, silver, bronze) and entry of the quantity of that prize to be awarded. FIG. 15H is an interface of trivia prizes selected for an auction with a chart displaying the prize type, quantity, and points.

Figure 16:
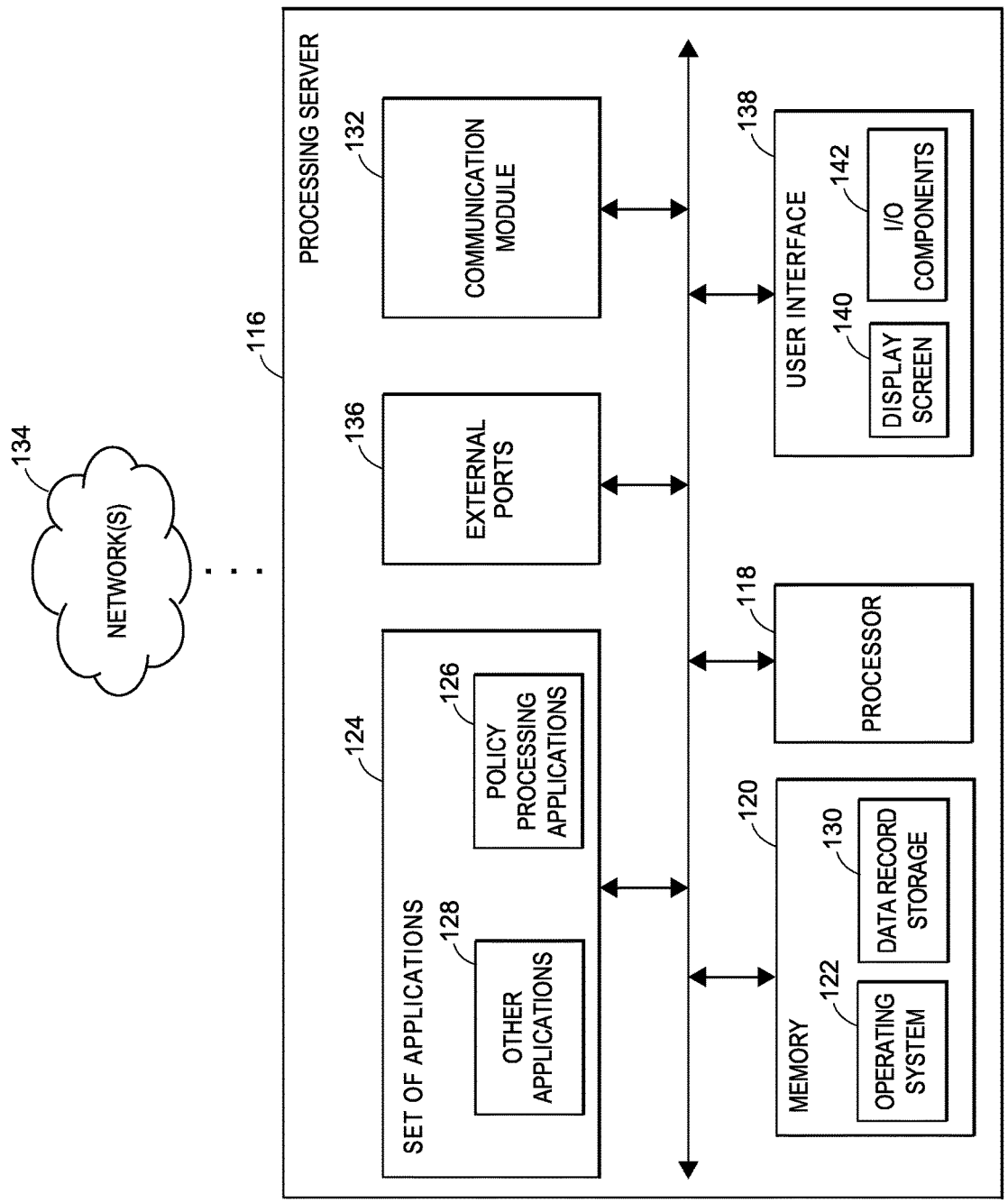
FIG. 16 is a block diagram of an exemplary processing server in accordance with some embodiments.

FIG. 16 illustrates a diagram of an exemplary processing server 116 (such as the server 6 discussed with respect to FIG. 1) in which the functionalities as discussed herein may be implemented. The processing server 116 may include a processor 118, as well as a memory 120. The memory 120 may store an operating system 122 capable of facilitating the functionalities as discussed herein, as well as a set of applications 124 (i.e., machine readable instructions). For instance, one of the set of applications 124 may be an auction platform 126 configured to manage an auction at a venue. It should be appreciated that other applications 128 are envisioned, such as a trivia application configured to facilitate a trivia competition between users at a venue.

The processor 118 may interface with the memory 120 to execute the operating system 122 and the set of applications 124. According to some embodiments, the memory 120 may also include a data record storage 130 that stores various information associated with auctions and engagement activities. The auction platform application 126 may interface with the data record storage 130 to retrieve relevant information that the auction platform application 126 may use to manage auctions, generate notifications regarding bidding, and/or perform other functionalities. Further, other applications 128 may interface with the data record storage 130 to retrieve information. The memory 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 116 may further include a communication module 132 configured to communicate data to, for example, a portable electronic device via one or more networks 134. According to some embodiments, the communication module 132 may include one or more transceivers (e.g., WWAN, WLAN, and/or WPAN transceivers) functioning in accordance with IEEE standards, 3GPP standards, or other standards, and configured to receive and transmit data via one or more external ports 136. For instance, the communication module 132 may receive, via the network 134, information associated with a portable electronic device.

The processing server 116 may further include a user interface 138 configured to present information to an administrator and/or receive inputs from the administrator. As shown in FIG. 15, the user interface 138 may include a display screen 140 and I/O components 142 (e.g., ports, capacitive or resistive touch sensitive input panels, keys, buttons, lights, LEDs, speakers, microphones). According to some embodiments, the user may access the processing server 116 via the user interface 138 to process auctions and/or perform other functions. In some embodiments, the processing server 116 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 116 (e.g., working in connection with the operating system 122) to facilitate the functions as described herein. In this regard, the program code may be implemented in any desired language, and/or may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Figure 17:
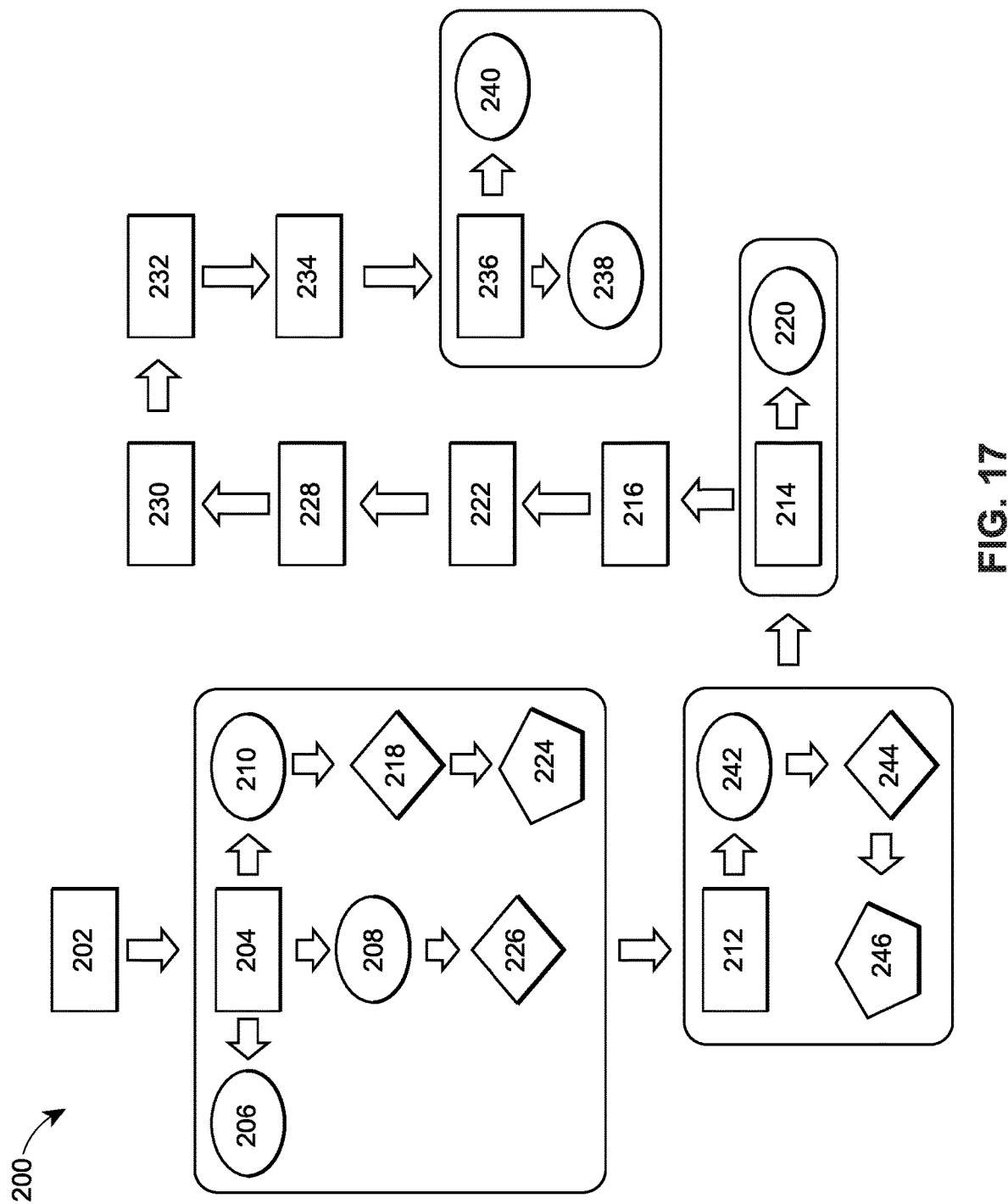
FIG. 17 is a block diagram of a computer-implemented method of managing an auction platform associated with a venue.

FIG. 17 depicts a computer-implemented method 200 of managing an auction platform associated with a venue. The method 200 may be performed by an electronic device such as the computer 10 as discussed with respect to FIG. 1, or any other type of electronic device. Box 202 represents receiving, from a portable electronic device via a network connection, a request to register the portable electronic device with the auction platform. Box 204 represents registering the portable device with the auction platform, which may include: identifying a location of the portable electronic device (shown by Box 206), and determining that the location of the portable electronic device is within a boundary associated with the venue (as shown by Box 208), initiating an auction for an item or service associated with an event taking place at the venue (as shown by Box 210). The location of the portable electronic device may be a set of global positioning system (GPS) coordinates, and determining that the location of the portable electronic device is within the boundary associated with the venue may include determining that the set of GPS coordinates is located within the boundary associated with the venue (as shown by Box 226).

Initiating the auction for the item or service may include enabling an administrator of the auction platform to identify the item or service, and input at least one of a start time, an end time, and a starting bid (as shown by Box 218). Enabling an administrator to specify the boundary associated with the venue may include enabling the administrator to specify an area defined by the venue and an auxiliary area at least partially surrounding the area defined by the venue (as shown by Box 224).

Box 212 represents transmitting, to the portable electronic device via the network connection, information associated with the auction for the item or service after registering the portable device with the auction platform, which may include receiving, from the portable electronic device, a request to access the auction (as shown in Box 242) and responsive to receiving the request to access the auction, transmitting, to the portable electronic device via the network connection, the information associated with the auction for the item or service (as shown in Box 244). Transmitting the information associated with the auction for the item or service may further include, in response to initiating the auction, automatically transmitting, to the portable electronic device via the network connection, information associated with the auction for the item or service (as shown in Box 246).

Box 214 represents receiving, from the portable electronic device via the network connection, a bid for the item or service. Receiving the request to register the portable electronic device with the auction platform may include receiving the request and the location of the portable electronic device (as shown by Box 220). Box 216 represents updating the auction for the item or service to reflect the bid.

Box 222 represents enabling an administrator of the auction platform to specify the boundary associated with the venue. Box 228 represents, upon an end time associated with the auction, determining that the bid is the highest bid for the auction. Box 230 represents processing a payment from a user of the portable electronic device according to the bid. Box 232 represents transmitting funds according to the payment to an account of a customer.

Box 234 represents receiving, from an additional portable electronic device via the network connection, an additional request to register the additional portable electronic device with the auction platform. Box 236 represents registering the additional portable device with the auction platform, which may include identifying an additional location of the additional portable electronic device (as shown by Box 238), and determining that the additional location of the additional portable electronic device is within the boundary associated with the venue (as shown by Box 240).

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 116 (e.g., working in connection with the operating system 116) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A computer-implemented method of managing a platform associated with a venue, the method comprising:
enabling an administrator of the platform to specify, via a user interface, a boundary associated with an event taking place at the venue including:
enabling the administrator to specify an area defined by the venue, and
enabling the administrator to specify the boundary that comprises a set of streets at least partially surrounding the area defined by the venue, wherein the boundary further encompasses the area defined by the venue;
receiving, from a portable electronic device via a network connection, a request to register the portable electronic device with the platform;
registering the portable electronic device with the platform including:
receiving, from the portable electronic device via the network connection, a set of coordinates indicative of a location of the portable electronic device, and
determining that the location of the portable electronic device is within the boundary;
configuring a trivia challenge and prize redemption associated with the event taking place at the venue including:
enabling the administrator to input, via the user interface, (i) a trivia question, (ii) at least one correct answer for the trivia question, and (iii) at least one incorrect answer for the trivia question, and
displaying, in the user interface, a set of prizes;
after registering the portable electric device with the platform, transmitting, to the portable electronic device via the network connection, information associated with the trivia challenge and prize redemption;
receiving, from the portable electronic device via the network connection, an answer for the trivia question; and
determining, based on at least one of the at least one correct answer or the at least one incorrect answer, whether the answer is correct.

2. The computer-implemented method of claim 1, wherein the boundary is unlocked such that a set of users located outside the boundary has access to the trivia challenge and prize redemption.

3. The computer-implemented method of claim 1, wherein configuring the trivia challenge and prize redemption further includes:
enabling the administrator to input, via the user interface, a point value associated with the trivia question.

4. The computer-implemented method of claim 1, further comprising:
when the answer is correct, determining a point value associated with the trivia question; and
enabling a user of the portable electronic device to review a current amount of accumulated trivia points, wherein the current amount of accumulated trivia points reflects the point value associated with the trivia question.

5. The computer-implemented method of claim 1, further comprising:
enabling a user of the portable electronic device to review (i) a current amount of accumulated trivia points, and (ii) the set of prizes.

6. The computer-implemented method of claim 5, further comprising:
enabling the user of the portable electronic device to redeem at least a portion of the current amount of accumulated trivia points for a prize of the set of prizes.

7. The computer-implemented method of claim 6, further comprising:
enabling the user of the portable electronic device to review a location where at least the portion of the current amount of accumulated trivia points is redeemable for the prize.

8. A system for managing a platform associated with a venue, comprising:
a transceiver configured to communicate with a portable electronic device via a network connection;
a user interface; and
a processor interfacing with the transceiver and the user interface, and configured to:
enable an administrator of the platform to specify, via the user interface, a boundary associated with an event taking place at the venue including:
enable the administrator to specify an area defined by the venue, and
enable the administrator to specify the boundary that comprises a set of streets at least partially surrounding the area defined by the venue, wherein the boundary further encompasses the area defined by the venue,
receive, from the portable electronic device via the transceiver, a request to register the portable electronic device with the platform,
register the portable electronic device with the platform including:
receive, from the portable electronic device via the transceiver, a set of coordinates indicative of a location of the portable electronic device, and
determine that the location of the portable electronic device is within the boundary,
configure a trivia challenge and prize redemption associated with the event taking place at the venue including:
enable the administrator to input, via the user interface, (i) a trivia question, (ii) at least one correct answer for the trivia question, and (iii) at least one incorrect answer for the trivia question, and
cause the user interface to display a set of prizes,
after registering the portable electronic device with the platform, transmit, to the portable electronic device via the transceiver, information associated with the trivia challenge and prize redemption,
receive, from the portable electronic device via the transceiver, an answer for the trivia question, and
determine, based on at least one of the at least one correct answer or the at least one incorrect answer, whether the answer is correct.

9. The system of claim 8, wherein the boundary is unlocked such that a set of users located outside the boundary has access to the trivia challenge and prize redemption.

10. The system of claim 8, wherein to configure the trivia challenge and prize redemption, the processor is further configured to:
enable the administrator to input, via the user interface, a point value associated with the trivia question.

11. The system of claim 8, wherein the processor is further configured to:
when the answer is correct, determine a point value associated with the trivia question, and
enable a user of the portable electronic device to review a current amount of accumulated trivia points, wherein the current amount of accumulated trivia points reflects the point value associated with the trivia question.

12. The system of claim 8, wherein the processor is further configured to:
enable a user of the portable electronic device to review (i) a current amount of accumulated trivia points, and (ii) the set of prizes.

13. The system of claim 12, wherein the processor is further configured to:
enable the user of the portable electronic device to redeem at least a portion of the current amount of accumulated trivia points for a prize of the set of prizes.

14. The system of claim 13, wherein the processor is further configured to:
enable the user of the portable electronic device to review a location where at least the portion of the current amount of accumulated trivia points is redeemable for the prize.

15. A non-transitory computer-readable medium, comprising:
a plurality of instructions which, when executed by one or more processors of a server supporting a platform, cause the one or more processors to:
enable an administrator of the platform to specify, via a user interface, a boundary associated with an event taking place at a venue including:
enable the administrator to specify an area defined by the venue, and
enable the administrator to specify the boundary that comprises a set of streets at least partially surrounding the area defined by the venue, wherein the boundary further encompasses the area defined by the venue,
receive, from a portable electronic device via a network connection, a request to register the portable electronic device with the platform,
register the portable electronic device with the platform including:
receive, from the portable electronic device via the network connection, a set of coordinates indicative of a location of the portable electronic device, and
determine that the location of the portable electronic device is within the boundary,
configure a trivia challenge and prize redemption associated with the event taking place at the venue including:
enable the administrator to input, via the user interface, (i) a trivia question, (ii) at least one correct answer for the trivia question, and (iii) at least one incorrect answer for the trivia question, and
display, in the user interface, a set of prizes,
after registering the portable electric device with the platform, transmit, to the portable electronic device via the network connection, information associated with the trivia challenge and prize redemption,
receive, from the portable electronic device via the network connection, an answer for the trivia question, and
determine, based on at least one of the at least one correct answer or the at least one incorrect answer, whether the answer is correct.

16. The non-transitory computer-readable medium of claim 15, wherein the boundary is unlocked such that a set of users located outside the boundary has access to the trivia challenge and prize redemption.

17. The non-transitory computer-readable medium of claim 15, wherein to configure the trivia challenge and prize redemption, the processor is configured to:
enable the administrator to input, via the user interface, a point value associated with the trivia question.

18. The non-transitory computer-readable medium of claim 15, wherein the plurality of instructions which, when executed by the one or more processors, further cause the one or more processors to:
when the answer is correct, determine a point value associated with the trivia question, and
enable a user of the portable electronic device to review a current amount of accumulated trivia points, wherein the current amount of accumulated trivia points reflects the point value associated with the trivia question.

19. The non-transitory computer-readable medium of claim 15, wherein the plurality of instructions which, when executed by the one or more processors, further cause the one or more processors to:
enable a user of the portable electronic device to review (i) a current amount of accumulated trivia points, and (ii) the set of prizes.

20. The non-transitory computer-readable medium of claim 19, wherein the plurality of instructions which, when executed by the one or more processors, further cause the one or more processors to:
enable the user of the portable electronic device to redeem at least a portion of the current amount of accumulated trivia points for a prize of the set of prizes.

* * * * *